US009183658B2

(12) United States Patent
Maloney et al.

(10) Patent No.: US 9,183,658 B2
(45) Date of Patent: Nov. 10, 2015

(54) ANIMATION CREATION AND MANAGEMENT IN PRESENTATION APPLICATION PROGRAMS

(75) Inventors: Christopher Michael Maloney, San Francisco, CA (US); Mirza Pasalic, Ottawa (CA); Runzhen Huang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/295,110

(22) Filed: Nov. 14, 2011

(65) Prior Publication Data
US 2013/0120400 A1 May 16, 2013

(51) Int. Cl.
G06T 13/80 (2011.01)
G06F 3/048 (2013.01)
G06T 13/00 (2011.01)

(52) U.S. Cl.
CPC .............. G06T 13/00 (2013.01); G06F 3/048 (2013.01); G06T 13/80 (2013.01)

(58) Field of Classification Search
USPC .................................................. 345/473, 474
See application file for complete search history.

(56) References Cited

U.S. PATENT DOCUMENTS

| 5,513,309 | A | 4/1996 | Meier et al. |
| 5,583,977 | A | 12/1996 | Seidl |
| 7,526,726 | B1 * | 4/2009 | Skwarecki et al. ........... 715/731 |
| 7,636,093 | B1 | 12/2009 | Kuwamoto |
| 2005/0046630 | A1 | 3/2005 | Jacob et al. |
| 2005/0097471 | A1 * | 5/2005 | Faraday et al. ............... 715/723 |
| 2005/0232587 | A1 | 10/2005 | Strawn et al. |
| 2007/0159477 | A1 * | 7/2007 | Schrag et al. ................. 345/419 |
| 2007/0262996 | A1 | 11/2007 | Fernandez et al. |
| 2008/0028314 | A1 * | 1/2008 | Bono et al. ..................... 715/732 |
| 2009/0119597 | A1 * | 5/2009 | Vaughan et al. .............. 715/732 |
| 2010/0156911 | A1 | 6/2010 | Zhao et al. |

(Continued)

FOREIGN PATENT DOCUMENTS

CN 102057351 A 5/2011
WO WO 99/06959 2/1999

OTHER PUBLICATIONS

"After Effects Keyframe Tutorial", Retrieved at <<http://www.ehow.com/way_5336478_after-effects-keyframe-tutorial.html>>, Retrieved Date: Jun. 29, 2011, pp. 4.

(Continued)

*Primary Examiner* — Aaron M Richer
*Assistant Examiner* — Schiller Hill
(74) *Attorney, Agent, or Firm* — Steve Crocker; Danielle Johnston-Holmes; Micky Minhas

(57) ABSTRACT

An animation timeline is analyzed to determine one or more discrete states. Each discrete state includes one or more animation effects. The discrete states represent scenes of a slide in a slide presentation. The concepts of scenes allows user to view a timeline of scenes, open a scene, and direct manipulate objects in the scene to author animations. The animations can include motion path animation effects, which can be directly manipulated utilizing a motion path tweening method. To aid in direct manipulation of a motion path of an object, a ghost version of the object can be shown to communicate to a user the position of the object after a motion path animation effect that includes the motion path is performed. The ghost version may also be used to show a start position when a start point is manipulated.

20 Claims, 17 Drawing Sheets

(56) References Cited

U.S. PATENT DOCUMENTS

| | | | |
|---|---|---|---|
| 2010/0214313 | A1 | 8/2010 | Herman et al. |
| 2011/0018880 | A1 | 1/2011 | Whited et al. |
| 2013/0120403 | A1 | 5/2013 | Maloney et al. |
| 2013/0120405 | A1 | 5/2013 | Maloney et al. |

OTHER PUBLICATIONS

"Animating Objects", Retrieved at <<http://msdn.microsoft.com/en-us/library/cc295346%28v=expression.40%29.aspx>>, Retrieved Date: Jun. 29, 2011, pp. 11.
Kirupa, "Tweening with Code—Page 1", Retrieved at <<http://www.kirupa.com/developer/flashcs3/tweening_with_code_pg1.htm>>, Aug. 10, 2008, pp. 2.
Doyle, Jack, "TweenLite—A Lightweight, FAST Tweening Engine", Retrieved at <<http://www.greensock.com/tweenlite/>>, Retrieved Date: Jun. 29, 2011, pp. 16.
"Edit the Motion Path of a Tween Animation", Retrieved at <<http://help.adobe.com/en_US/flashics/using/WS182B69A5-E054-4a1c-9951-B2F1254BBCDE.html>>, Retrieved Date: Jun. 29, 2011, pp. 5.
Tessler, Franklin N., "Apple Keynote '09", Retrieved at <<http://www.macworld.com/article/138373/2009/01/keynote09.html>>, Jan. 23, 2009, pp. 6.
"Frames and Keyframes", Retrieved at <<http://help.adobe.com/en_US/Flash/10.0_UsingFlash/WSd60f23110762d6b883b18f10cb1fe1af6-7ec8a.html>>, Retrieved Date: Jun. 29, 2011, pp. 6.
"Edit the Motion Path of a Tween Animation", as published May 7, 2010 at help.adobe.com downloaded Dec. 17, 2012 from <<http://web.archive.org/web/20100507112540/http://help.adobe.com/en_US/ftash/cs/using/WS182B69A5-E054-4a1c-9951-B2F1254BBCDE.html>>. 3 pp.
Green, et al. Foundation Flash CD5 for designers. New York: Friends of ED, 2010, Chapter 8, Animation, Part 2, 70pp.
"Transforming objects" , as published May 10, 2010 at help.adobe.com, downloaded Dec. 17, 2012 from <<http://web.archive.org/web/201 0051 0191156/http://help.adobe.com/en_US/flash/cs/using/WSd60f2311 0762d6b883b18f1Ocb1fe1af6-7e02a.html#WSd6Of2311 0762d6b883b18f1Ocb1fe1af6-7 df7 a>> 4pp.
"About tweened animation" , as published May 7, 2010 at help.adobe.com, downloaded Dec. 17, 2012 from <<web.archive.org/web/20100507112544/http://help.adobe.com/en_US/flash/cs/using/WSd6Of2311 0762d6, 3pp.
"Adobe Ships Creative Suite 5" as published Apr. 30, 2010 , downloaded on Jan. 22, 2013 from <<www.adobe.com/aboutadobe/pressroom/pressreleases/201 004/04301 OAdobeShipsCS5.html>>, 3 pp.
U.S. Official Action dated Feb. 4, 2013 in U.S. Appl. No. 13/298,810.
U.S. Official Action dated Feb. 4, 2013 in U.S. Appl. No. 13/298,833.
European Search Report dated Mar. 26, 2013 in European Application No. 12192577.0.
Meng, "[Chimera-users] making movie with the animation utility," Dec. 13, 2011, retrieved from http://plato.cgl.ucsf.edu/pipermail/chimera-users/2011-December/007013.html, 2 pages.
U.S. Official Action dated Mar. 28, 2014 in U.S. Appl. No. 13/298,833.
European Official Action dated Feb. 3, 2014 in European Application No. 12192577.0.
Meng, Elaine, "Confirmation of the publication date of a feature in the Chimera software" Published on Jan. 24, 2014, XP055098732, pp. 2.
U.S. Official Action dated Aug. 28, 2013 in U.S. Appl. No. 13/298,810.
U.S. Official Action dated Aug. 26, 2013 in U.S. Appl. No. 13/298,833.
U.S. Official Action dated Aug. 14, 2014 in U.S. Appl. No. 13/298,833.
Chinese Official Action dated Oct. 31, 2014 in Chinese Application No. CN 201210458990.4 Abstract.
U.S. Official Action dated Jun. 5, 2014 in U.S. Appl. No. 13/298,810.
Office action for U.S. Appl. No. 13/298,833, mailed on Apr. 8, 2015, Maloney et al., "Animation Creation and Management in Presentation Application Programs", 42 pages.
Translated Chinese Office Action mailed Jul 23, 2015 for Chinese patent application No. 201210458990.4, a counterpart foreign application of U.S. Appl. No. 13/295,110, 6 pages.

* cited by examiner

ANIMATION CREATION AND MANAGEMENT IN PRESENTATION APPLICATION PROGRAMS

BACKGROUND

Presentation application programs, such as MICROSOFT POWERPOINT, available from Microsoft of Redmond, Wash., allow users to create individual pages or "slides" for presentation in the form of a slide show. Each slide may contain text, graphics, sound, videos, and other objects. Animations may be applied to certain objects in a slide, such as text and graphics, to enhance the slide show.

Currently, MICROSOFT POWERPOINT's animation user interface ("UI") requires users to select an object, apply an animation primitive, and then adjust settings through a series of drop-down menus, spinners, and dialogs. Animation triggers include "On click", in which an animation effect is applied upon the click of the slide; "With previous", in which an animation effect is played at the same time as the previous item in the animation list or on load of the slide if the effect is first in the animation list; and "After previous", in which an animation effect is played immediately following the previous item in the animation list. Navigating the current MICROSOFT POWERPOINT user interface may be cumbersome to use for some users, and may prevent others from taking advantage of the animation features included in the program.

One particular type of animation effect is a motion path animation effect. When a user wants to animate an object utilizing a motion path animation effect, the user must provide an initial state for the object, a final state for the object, and define a type of path along which the object will move when the motion path animation effect is executed. The type of motion path may be a pre-defined motion path or a custom motion path. If the motion path is a straight line, the initial state or the end state can be easily adjusted by simply redrawing the line in between the two states. If the motion path is curved, however, then additional logic that is needed to properly scale the motion path to maintain the motion path itself. Moreover, when manipulating a motion path, it is helpful to know the end state of the motion path animation effect to allow for confident re-positioning of the end state.

It is with respect to these and other considerations that the disclosure made herein is presented.

SUMMARY

Concepts and technologies are described herein for creating and managing animations in a presentation application program. In accordance with the concepts and technologies disclosed herein, an animation timeline is analyzed to determine one or more discrete states. Each discrete state includes one or more animation effects. The discrete states represent scenes of a slide in a slide presentation. The concepts of scenes allows user to view a timeline of scenes, open a scene, and direct manipulate objects in the scene to author animations. The animations can include motion path animation effects, which can be directly manipulated utilizing a motion path tweening method. To aid in direct manipulation of a motion path of an object, a ghost version of the object can be shown to communicate to a user the position of the object after a motion path animation effect that includes the motion path is performed. The ghost version may also be used to show a start position when a start point is manipulated.

According to one aspect disclosed herein, a computer-readable storage medium includes computer-executable instructions that, when executed by a computer, cause the computer to present an animation pane on a display connected to the computer. The animation pane includes a scenes view and a list view. The scenes view of the animation pane includes a transparent scene thumbnail that, upon selection, opens a temporary new scene. The list view includes an animation timeline. The instructions also cause the computer to receive a selection of the transparent scene thumbnail from the scenes view, open the temporary new scene, receive a user input including a new animation effect in the temporary new scene, and create a new discrete state in the animation timeline. The new discrete state includes the new animation effect. The instructions also cause the computer to create a new scene from the temporary new scene. The new scene includes the new animation effect. The new scene includes a visualization for the new discrete state. The instructions also cause the computer to create a new scene thumbnail, create a new transparent scene thumbnail, and present, on the display, the new scene thumbnail and the new transparent scene thumbnail in the scenes view of the animation pane.

According to another aspect disclosed herein, a method for generating discrete states of an animation timeline includes analyzing, by a presentation application program executing on a computer, a plurality of animation effects in an animation timeline to determine one or more discrete states to be generated for the animation timeline, and generating, by the presentation application program executing on the computer, the one or more of discrete states for the animation timeline, wherein each of the one or more states includes one or more of the plurality of animation effects. In some embodiments, the analyzing operation of the method includes analyzing the plurality of animation effects in the animation timeline to determine which of the plurality of animation effects in the animation timeline are triggered by a user-controlled trigger, such as, but not limited to an on mouse click trigger, or a pre-configured trigger, such as, but not limited to, an after previous trigger. An animation effect that is triggered by the after previous trigger or the on mouse click trigger indicates a start of one of the one or more discrete states.

According to yet another aspect disclosed herein, a computer-implemented method for defining animations includes receiving, via a presentation application program executing on a computer, an input of a motion path animation effect for an object. The motion path animation effect includes a start point for the object, an end point for the object, and a motion path between the start point and the end point. The method further includes receiving, via the presentation application program executing on the computer, an input of a new start point and a new end point for the object, and scaling, via the presentation application program executing on the computer, the motion path of the motion path animation effect to fit between the new start point and the new end point for the object.

According to yet another aspect disclosed herein, a computer-readable storage medium includes computer-executable instructions that, when executed by a computer, cause the computer to present, on a display that is in communication with the computer, a canvas and an object on the canvas. The instructions also cause the computer to receive a motion path animation effect for the object. The motion path animation effect includes a start point, an end point, and a motion path between the start point and the end point. The instructions also cause the computer to generate a ghost version of the object, and present, on the display, the object, the ghost version of the object, the start point, the end point, and the motion path on the canvas. The ghost version of the object is presented in proximity to the end point, and the ghost version of the object represents the object after the motion path animation effect has been performed.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
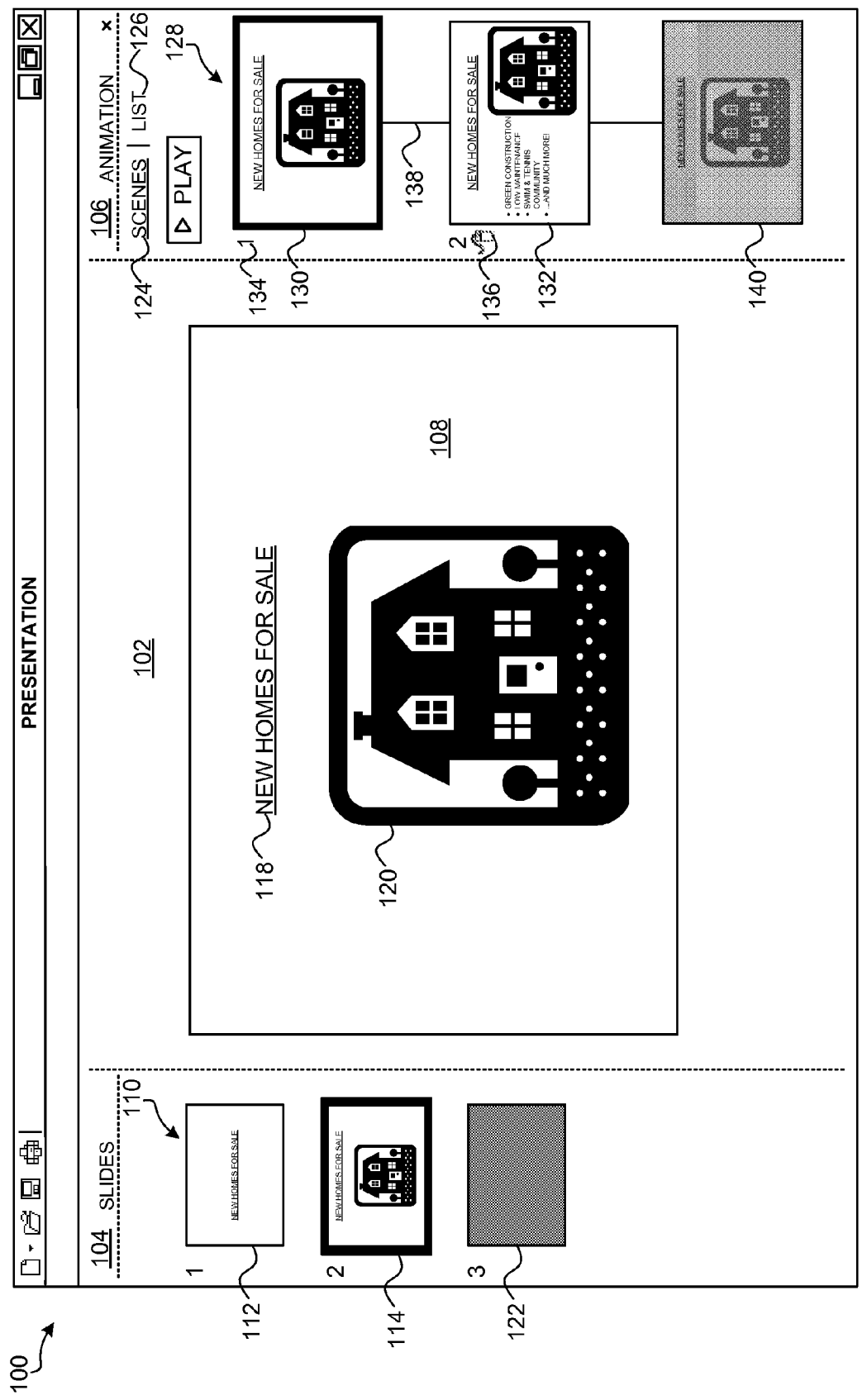
FIGS. 1-2 are a user interface diagrams illustrating aspects of an exemplary operating environment for various concepts disclosed herein.

The following detailed description is directed to concepts and technologies for creating and managing animations in presentation application programs. According to the concepts and technologies described herein an animation timeline is analyzed to determine one or more discrete states. Each discrete state includes one or more animation effects. The discrete states represent scenes of a slide in a slide presentation. The concepts of scenes allows user to view a timeline of scenes, open a scene, and direct manipulate objects in the scene to author animations. The animations can include motion path animation effects, which can be directly manipulated utilizing a motion path tweening method. To aid in direct manipulation of a motion path of an object, a ghost version of the object can be shown to communicate to a user the position of the object after a motion path animation effect that includes the motion path is performed. The ghost version may also be used to show a start position when a start point is manipulated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for creating and managing animations in presentation application programs will be presented.

FIG. 1 is a user interface diagram illustrating aspects of an exemplary operating environment for various concepts disclosed herein. In particular, FIG. 1 shows an illustrative user interface 100 provided by a presentation application program according to one implementation disclosed herein. As will be described in greater detail below, the user interface 100 is utilized, in part, to author animations for objects, such as shapes, graphics, pictures, text, audio, video, charts, graphs, and like objects, to view the animations in one or more scenes of an animation sequence, and to manage the scenes.

In the illustrated embodiment, the user interface 100 includes a layout area 102, a slide selection pane 104, and an animation pane 106. The configuration of the layout area 102, the slide selection pane 104, and the animation pane 106 is illustrative and is not intended to be limiting in any way. The layout area 102 is utilized to create a layout of one or more objects on a slide canvas 108 and to directly manipulate one or more of the objects to author animations to create scenes for one or more slides of a slide presentation.

The slide selection pane 104 is utilized to show slide thumbnails for each slide that has been created in the active slide presentation. These are generally shown slide thumbnails 110. In the illustrated embodiment, the slide selection pane 104 includes a first slide thumbnail 112 for a first slide and a second slide thumbnail 114 for a second slide. The second slide thumbnail has been selected and, as a result, the content of the second slide displayed in the slide area 102 on the slide canvas 108. As illustrated, the second slide includes a title object 118 and a picture object 120.

As new slides are added to the presentation or as existing slides are deleted from the presentation, slide thumbnails 110 are respectively added to or deleted from the slide selection pane 104. A new slide may be added to the presentation by selecting a grayed-out slide thumbnail 122 in the slide selection pane 104. Additionally or alternatively, a new slide may be added through a user interface object, such as a user interface icon or user interface menu that is always visible or that is made visible as a result of some user input, such as a mouse click, touch input, or voice input.

Each slide in a presentation may include an animation sequence for animations of the objects within the slide. The animation sequence is represented in the animation pane 106 in either a scenes view 124 or a list view 126. The list view 126 includes an animation timeline depicting each animation of the animation sequence for the selected slide. An illustrative list view is described in greater detail below with reference to FIG. 2. An illustrative animation timeline is described in greater detail below with reference to FIG. 3.

The scenes view 124 includes one or more scenes depicted as scene thumbnails in a timeline of scenes 128. A scene is a discrete state in an animation timeline. The scene thumbnails may appear like the slide thumbnails 110, but are representative of scenes within the selected slide thumbnail. For example, in the illustrated embodiment, a first scene represented in the time line of scenes 128 as a first scene thumbnail 130 has been selected and, accordingly, the title object 118 and the picture object 120 are displayed in the slide area 102 on the slide canvas 108. If a second scene thumbnail 132 is selected, the layout included in a second scene of the selected slide is displayed in the slide area 102 on the slide canvas 108 and so on. The selected scene may then be edited by adding or deleting objects, manipulating objects, adding or deleting animations, manipulating animations, and so on.

An animation of an object that begins with an "On Mouse Click" trigger or an "After Previous" trigger is identified as the start of a new scene. The "On Mouse Click" causes an animation to begin on click of a mouse. Other inputs such as touch or voice inputs may be used as alternative triggers for such functionality. The "After Previous" trigger causes an animation to begin immediately after the previous item in the animation timeline if the previous item is finished playing. That is, no additional click or other input is needed trigger the next animation to start. Additionally, the first animation in the animation timeline may be the start of a new scene.

Although an "On Mouse Click" trigger is described above, other exemplary user-controlled triggers that may be used to denote the start of a new scene are contemplated. Moreover, although an "After Previous" trigger is described above, other exemplary pre-configured triggers that may be used to denote the start of a new scene are contemplated. As such, the uses of an "On Mouse Click" trigger and an "After Previous" trigger herein are intended to be illustrative and should not be interpreted as being limiting.

In the illustrated embodiment, the scenes view 124 and the list view 126 are selectable via tabs within the animation pane 106. It should be understood that other configurations are possible including, but not limited to, dedicated animation panes for each view. As such, the illustrated embodiment should not be interpreted as being limiting in any way.

Each scene thumbnail in the timeline of scenes 128 may be associated with a scene number 134, as in the illustrated embodiment. Moreover, each scene thumbnail in the timeline of scenes 128 may include an icon or other visual representation of the type of trigger that causes the scene to be played. In the illustrated embodiment, a mouse icon 136 is shown adjacent to the second scene thumbnail to indicate that the second scene thumbnail 132 is triggered by an "On Mouse Click" trigger. As will be shown in FIG. 3, a clock icon may be used to indicate that a particular scene is triggered by an "After Previous" trigger. This icon or any other such icon may be relegated to the animation timeline in the list view 126, may be included in the scenes view 124 and the list view 126, or may not be displayed at all. These icons are merely illustrative and should not be interpreted as being limiting in any way.

The illustrated timeline of scenes 128 includes a line 138 to the next scene to represent linearity between the scenes. The line 138 extends through each scene thumbnail in the timeline of scenes 128 and ends at a transparent scene thumbnail 140. Selection of the transparent scene thumbnail 140 causes a temporary new scene (not shown) to be shown on the slide canvas 108. After an animation is received within the temporary new scene, the temporary new scene becomes a new scene. The new scene is then added to the animation timeline of the list view 126 as a new discrete state, and a new scene thumbnail (not shown) is added to the scenes view 124. Another transparent scene thumbnail like the transparent scent thumbnail 140 then may be added to the timeline of scenes 128.

Although only a layout area 102, a slide selection pane 104, and an animation pane 106 have been described, one or more additional areas, panes, or other user interface spaces may be provided in the user interface 100 concurrently with the above or in various different interactive states of the user interface 100. For instance, additional areas, panes, or other spaces might also be provided for displaying user interface icons or other types of user interface objects for initiating some of the functionality described herein and other functions including, but not limited to, other functions of presentation application programs such as MICROSOFT POWERPOINT, available from MICROSOFT CORPORATION of Redmond, Wash., and other functions not disclosed herein.

In this regard, it should be appreciated that the user interface 100 and the remainder of the user interfaces disclosed herein have been greatly simplified for purposes of discussion. The user interfaces described herein might include more or fewer components, might be arranged differently, and might operate in a different fashion while still remaining within the scope of the disclosure provided herein. It should also be appreciated that while various user input devices will be described with respect to the various embodiments disclosed herein, other types of user input mechanisms might also be utilized. For instance, although the various embodiments described herein are disclosed in conjunction with the use of a mouse user input device controlling a mouse cursor, other types of user input devices and mechanisms such as keyboards, touch screens, proximity sensors, accelerometers, voice input, and others may be utilized.

Figure 2:
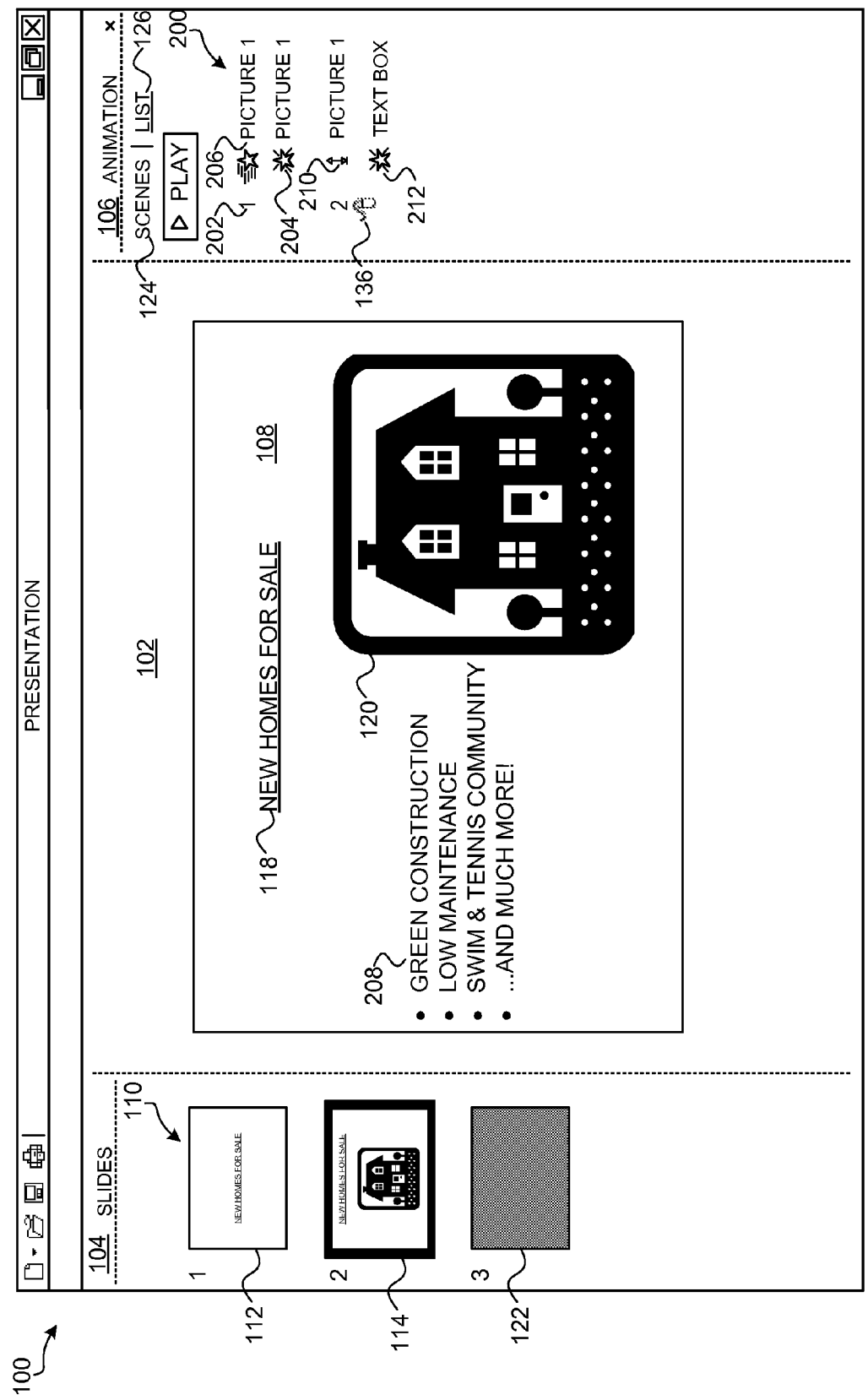

FIG. 2 is a user interface diagram of the user interface 100 illustrating additional aspects of an exemplary operating environment for various concepts disclosed herein. In the illustrated embodiment, the list view 126 has been selected in the animation pane 106. The list view 126 includes an animation timeline 200. The animation timeline 200 includes a list of animations and the objects to which the animations have been applied. The animation timeline 200 may also include a scene number 202 to indicate the scene to which each animation or group of animations is associated, as in the illustrated embodiment. As also shown in the illustrated embodiment, each animation in the animation timeline 200 may include an animation icon 204 to indicate a type of animation effect or a category of animation effects currently associated with the object referenced in an object description 206.

Illustrative categories of animation effects include, but are not limited to, entrance animation effects, exit animation effects, emphasis animation effects, and motion path animation effects. Illustrative entrance animation effect include, but are not limited to, appear effect, fade effect, fly in, float in, split, wipe, shape, wheel, random bars, grow and turn, zoom, swivel, and bounce. Illustrative exit animation effects include, but are not limited to, disappear, fade, fly out, float out, split, wipe, shape, wheel, random bars, shrink and turn, zoom, swivel, and bounce. Illustrative emphasis effects include, but are not limited to, pulse, color pulse, teeter, spin, grow, shrink, desaturate, darken, lighten, transparency, object color, complementary color, line color, brush color, font color, underline, bold flash, bold reveal, and wave. Illustrative motion path effects include, but are not limited to, lines, arcs, turns, shapes, loops, and custom paths.

In the illustrated embodiment, a second scene has been selected and is shown on the slide canvas 108. The second scene includes the title object 118, the picture object 120, and a text box object 208. The second scene is shown as being triggered by an "On Mouse Click" trigger, as indicated by the mouse icon 136.

The illustrated animation timeline 200 includes an animation effect for the picture object 120 and an animation for the text box 208. In particular, a motion path animation effect has been applied to the picture object 120, as indicated by an illustrative motion path icon 210, and an appear entrance effect has been applied to the text box object 208, as indicated by an illustrative appear icon 212. The motion path animation effect causes the picture object 120 to move from the center of the slide canvas 108 to the right side of the slide canvas 108. The motion path along which the picture object 120 moves to reach the end point at the right side of the slide canvas 108 may be directly manipulated to create a custom motion path, as will be described in greater detail below. The appear entrance effect causes the text box object 208 to appear on the slide canvas 108. It should be understood that these particular animation effects are merely illustrative and are not intended to be limiting in any way. It also should be understood that additional animations may be applied to each object, such as is the case illustrated for the picture object 120 in the first scene.

Figure 3:
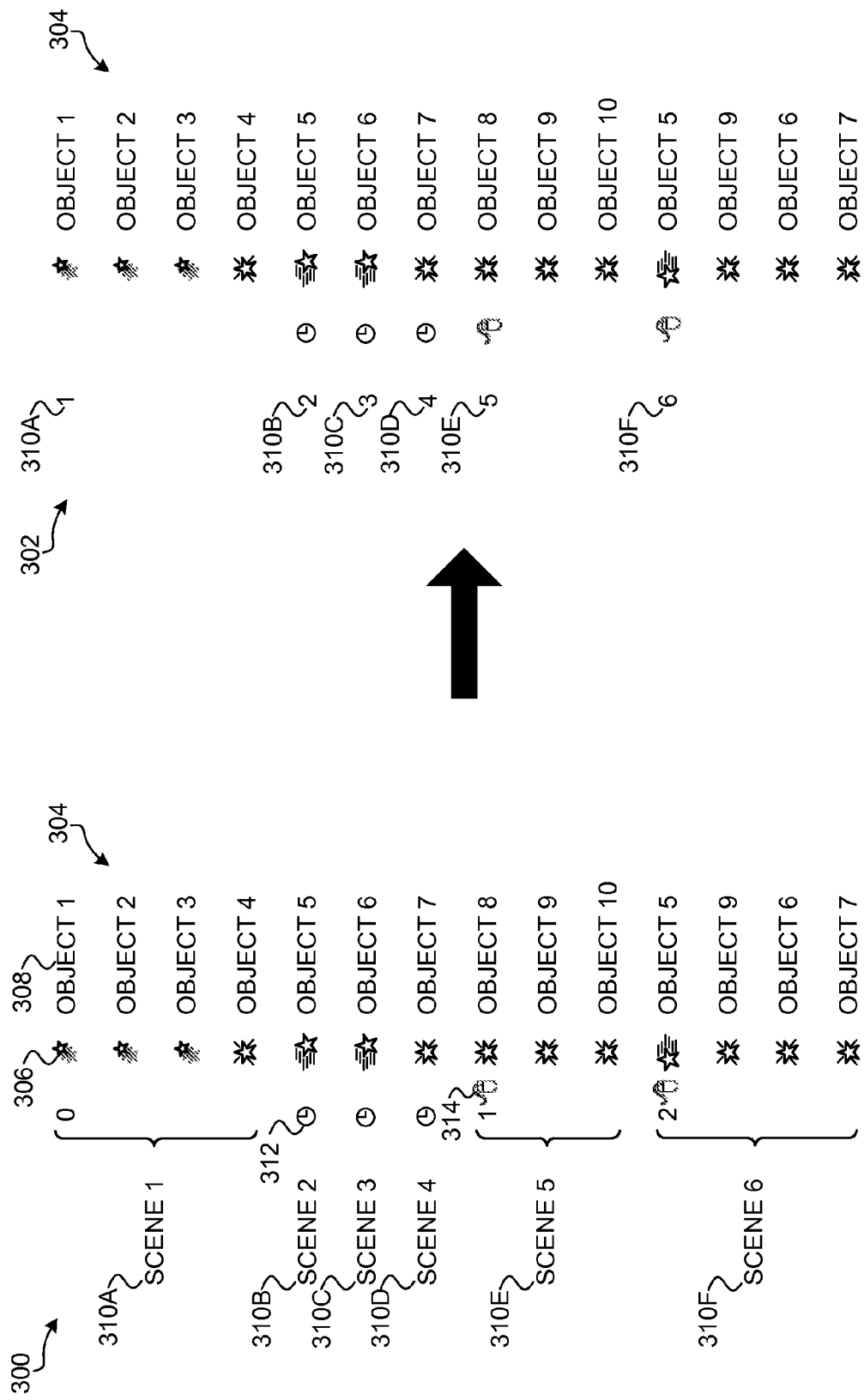
FIG. 3 is a diagram illustrating aspects of an animation timeline before and after a scene analysis is performed, according to an illustrative embodiment.

FIG. 3 is a diagram illustrating aspects of an animation timeline before and after a scene analysis is performed, according to an illustrative embodiment. The animation timeline before the scene analysis is performed is illustrated as a before state 300. The animation timeline after the scene analysis is performed is illustrated as an after state 302. It should be understood that the contents of the animation timeline in the before state 300 and the after state 302 are merely illustrative and are not intended to be limiting in any way. In some embodiments, only the after state 302 is shown in the list view 126 of the animation pane 106. As such, the before state 300 is shown to demonstrate how the presentation application program analyzes a plurality of animation effects in an animation timeline to determine one or more discrete states that are to be generated for the timeline and shown in the scene view 124 of the animation pane 106 as one or more selectable scene thumbnails.

The illustrated before state 300 of the animation timeline includes a plurality of animation effects, shown generally as animation effects 304. Each of the animation effects 304 includes an animation icon, shown representatively as an animation icon 306 for a first animation effect of the animation effects 304. Each of the animation effects 304 also includes an object description, shown representatively as an object description 308.

The animation effects 304 are divided into one or more scenes. As mentioned above, a scene is a discrete state in the animation timeline. The first animation in any given discrete state is an animation that is triggered by an "On Mouse Click" trigger or an "After Previous" trigger. The first animation in the animation timeline also indicates the beginning of a first scene.

In the illustrated embodiment, the animation effects 304 are divided into six scenes 310A-310F. The first scene 310A begins with an animation effect that is to be applied to OBJECT 1 and ends with an animation effect that is to be applied to OBJECT 4. The first scene 310A is demarcated from the second scene 310B by an animation effect that is to be applied to OBJECT 5 and that is triggered by an "After Previous" trigger, as indicated by an illustrative clock icon 312. The third scene 310C is demarcated from the second scene 310B by an animation effect that is to be applied to OBJECT 6 and that is triggered by an "After Previous" trigger, as also indicated by a clock icon 312. Similarly, the fourth scene 310D is demarcated from the third scene 310C by an animation effect that is to be applied to OBJECT 7 and that is triggered by an "After Previous" trigger, as also indicated by a clock icon 312. The fifth scene 310E is demarcated from the fourth scene 310D by an animation effect that is to be applied to OBJECT 8 and that is triggered by an "On Mouse Click" trigger, as indicated by a mouse icon 314. Similarly, the sixth scene 310F is demarcated from the fifth scene 310E by an animation effect that is to be applied to OBJECT 5 and that is triggered by an "On Mouse Click" trigger, as also indicated by a mouse icon 314.

In the before state 300 of the animation timeline, the first animation and each animation that is associated with either an "After Previous" trigger or an "On Mouse Click" trigger are numbered. In the after state 302 of the animation timeline, each of the six scenes 310A-310F is numbered. In other words, animation numbering in the before state 300 of the animation timeline user input, such as starting a slide in a slide show or an "On Mouse Click" trigger, but animation numbering in the after state 302 is based upon to which scene each animation belongs. The after state 302 of the animation timeline is made viewable in the scenes view 126 after the scene analysis.

Figure 4A:
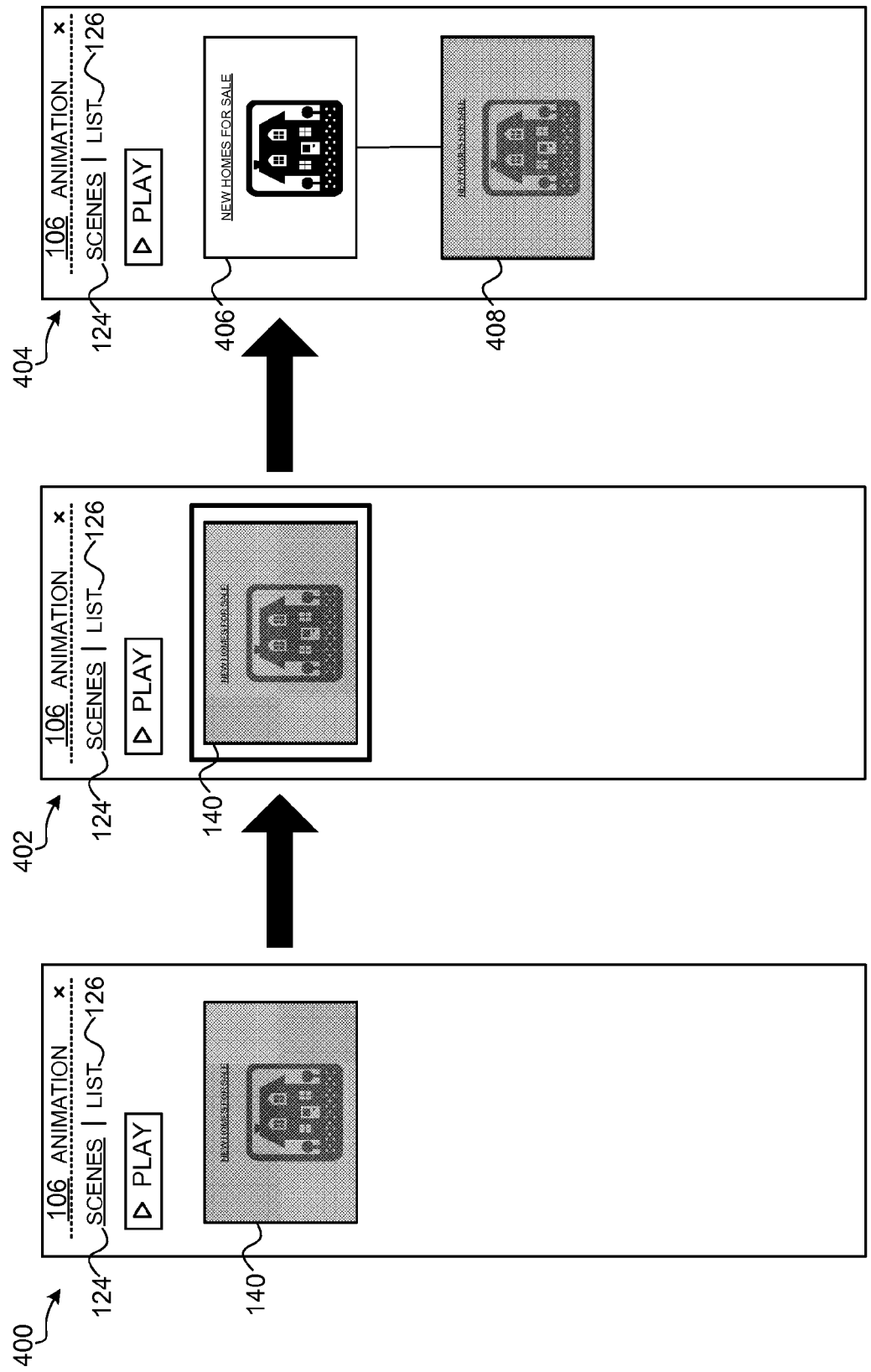
FIGS. 4A-4B are user interface diagrams of an animation pane illustrating aspects of a mechanism for adding a new scene to a slide, according to an illustrative embodiment.
Figure 4B:
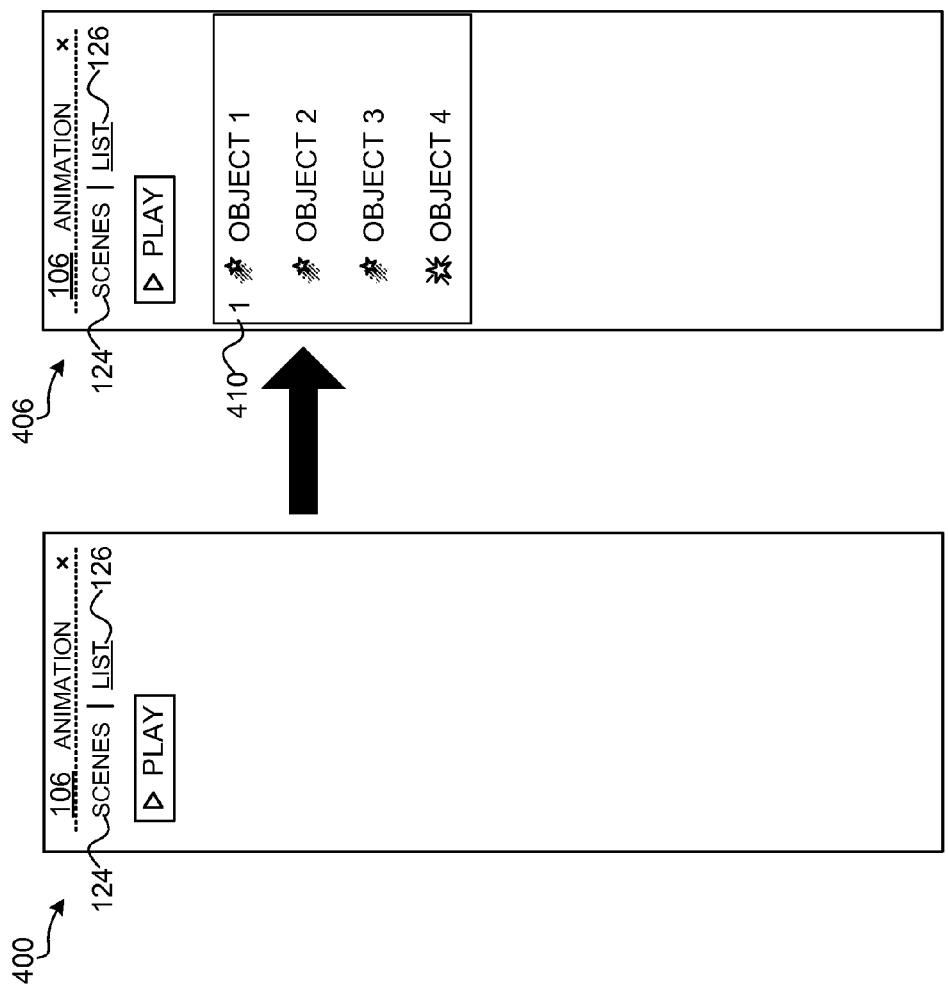

FIGS. 4A-4B are user interface diagrams of the animation pane 106 illustrating aspects of a mechanism for adding a new scene to a slide, according to an illustrative embodiment. FIG. 4A illustrates the animation pane 106 in the scenes view 124 and FIG. 4B illustrates the animation pane 106 in the list view 126. FIG. 4A will now be described.

FIG. 4A illustrates a first state 400 of the animation pane 106, a second state 402 of the animation pane 106, and a third state 404 of the animation pane 106. The first state 400 of the animation pane 106 shows a transparent scene thumbnail 140. When the transparent scene thumbnail 140 is selected, as shown in the second state 402 of the animation pane 106, a temporary new scene (not shown) is created. The temporary new scene is displayed on the slide canvas 108. After an object and/or animation are added to the temporary new scene, the temporary new scene becomes a new scene, which is represented in the third state 404 of the animation pane 106 as a new scene thumbnail 406. A new transparent scene thumbnail 408 may be created and positioned after the new scene thumbnail 406, as in the illustrated embodiment. The new transparent scene thumbnail 408 functions like the transparent scene thumbnail 140.

FIG. 4B illustrates the first state 400 of the animation pane 106 and the third state 406 of the animation pane 106 when the animation pane 106 is in the list view 126. The first state 400 of the animation pane 106 in the list view 126 is empty to reflect that no scenes exist. It is contemplated, however, that a user interface object (not shown) may be made available to facilitate creation of a new scene within the list view 126. The third state 406 of the animation pane 106 in the list view 126 shows a new scene animation list 410 including the animation effects applied during the new scene represented as the new scene thumbnail 406 in the scenes view 124 of FIG. 4A. The second state 404 is not illustrated in FIG. 4B since the new scene animation list 410 does not exist until a new scene is created after an object and/or animation are added to the temporary new scene.

Figure 5A:
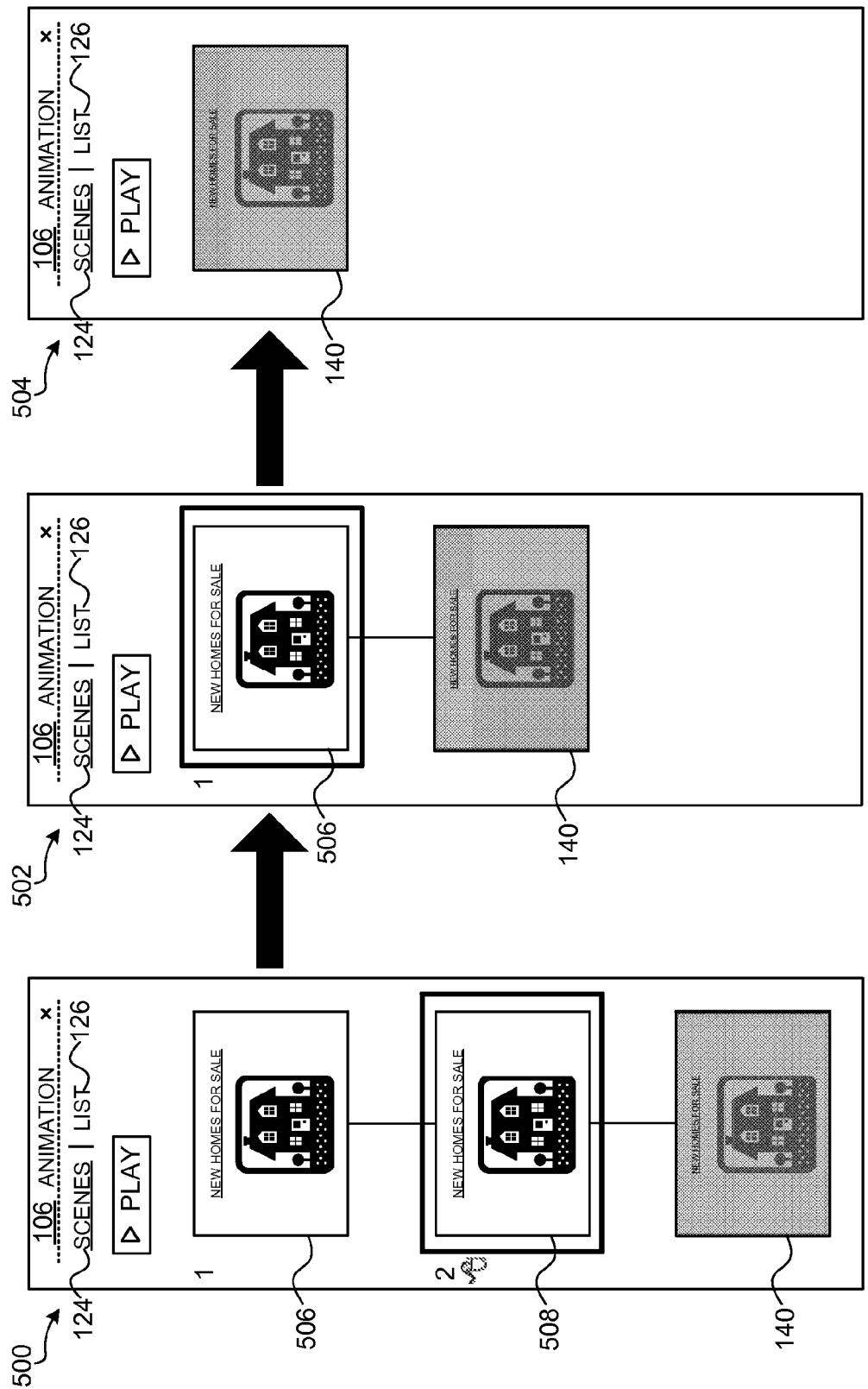
FIGS. 5A-5B are user interface diagrams of an animation pane illustrating aspects of a mechanism for deleting a scene from a slide, according to an illustrative embodiment.
Figure 5B:
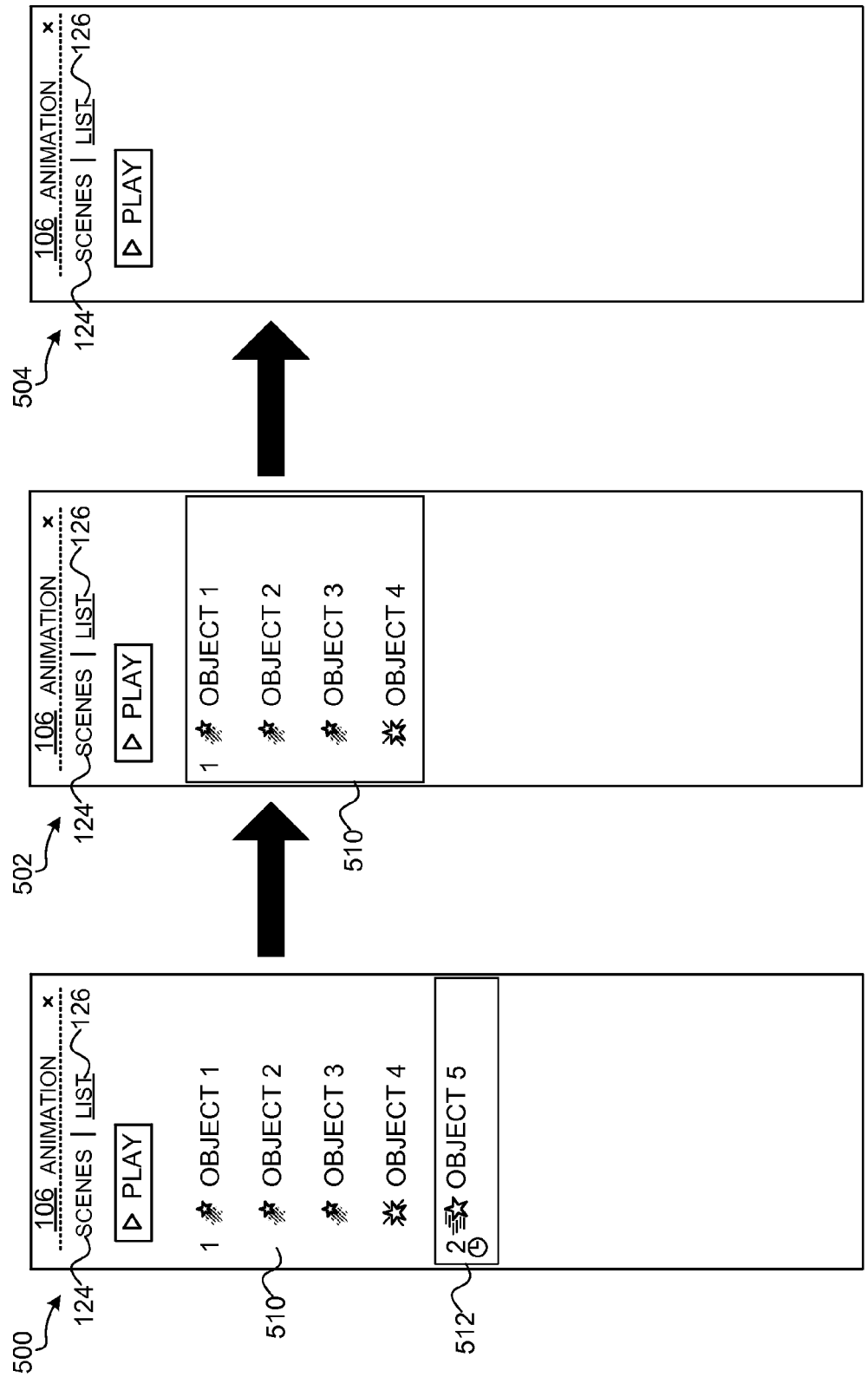

FIGS. 5A-5B are user interface diagrams of the animation pane 106 illustrating aspects of a mechanism for deleting a scene from a slide, according to an illustrative embodiment. FIG. 5A illustrates the animation pane 106 in the scenes view 124 and FIG. 5B illustrates the animation pane 106 in the list view 126. FIG. 5A will now be described.

FIG. 5A illustrates a first state 500 of the animation pane 106, a second state 502 of the animation pane 106, and a third state 504 of the animation pane 106. The first state 500 of the animation pane 106 shows a first scene thumbnail 506, a second scene thumbnail 508, and a transparent scene thumbnail 140. In the illustrated first state 500, the second scene thumbnail 508 has been selected for deletion. The second scene thumbnail 508 is then deleted from the scenes view 124 of the animation pane 106 in response a delete input received via a delete key of a keyboard, a delete software button (not shown) available within the animation pane 106 or elsewhere within the user interface 100, or in response to some other input such as a touch gesture or voice input. After the second scene thumbnail 508 has been deleted, the animation pane 106 is in the second state 502.

The second state 502 of the animation pane 106 shows the first scene thumbnail 506 and the transparent scene thumbnail 140. In the illustrated second state 502, the first scene thumbnail 506 has been selected for deletion. The first scene thumbnail 506 is then deleted from the scenes view 124 of the animation pane 106 in response a delete input received in a manner such as described above. After the first scene thumbnail 506 has been deleted, the animation pane 106 is in the third state 504. The third state 506 of the animation pane 106 shows the transparent scene thumbnail 140.

FIG. 5B illustrates the first state 500 of the animation pane 106, the second state 502 of the animation pane 106, and the third state 504 of the animation pane 106 when the animation pane 106 is in the list view 126. The first state 500 of the animation pane 106 in the list view 126 shows a first scene animation list 510 and a second scene animation list 512. The first scene animation list 510 includes the animation effects applied during a first scene of a slide. The second scene animation list 512 includes the animation effect applied during a second scene of the slide.

In the illustrated first state 500, the second scene animation list 512 has been selected for deletion. The second scene animation list 512 is then deleted from the list view 126 of the animation pane 106 in response a delete input received in a manner such as described above. After the second scene animation list 512 has been deleted, the animation pane 106 is in the second state 502.

The second state 502 of the animation pane in the list view 126 shows the first scene animation list 510. The first scene animation list 510 has been selected for deletion. After the first scene animation list 510 has been deleted, the animation pane 106 is in the third state 502. The third state 504 of the animation pane 106 in the list view 126 is empty to reflect that no scenes exist.

In some cases, it may be desirable to delete a scene that is positioned between two scenes. In these cases, after a scene that is positioned between two scenes is deleted, the initial state of all objects within the next scene after the deleted scene are applied to the final state of all objects within the scene positioned before the deleted scene to maintain continuity between the scene positioned before the deleted scene and the scene positioned after the deleted scene.

Scenes may be reordered in the scenes view 124 or the list view 126 in the animation pane. To reorder a scene, a scene thumbnail or a scene animation list is selected and moved to a new location within the animation pane 106. The presentation application program is configured to update all scenes from the start range to the end range of the position change.

After a scene is opened, objects on the slide canvas 108 that are associated with that scene can be directly manipulated. In some embodiments, any changes that are made to the objects are encoded as animations in that scene. Alternatively or additionally, animations may be inserted.

Figure 6:
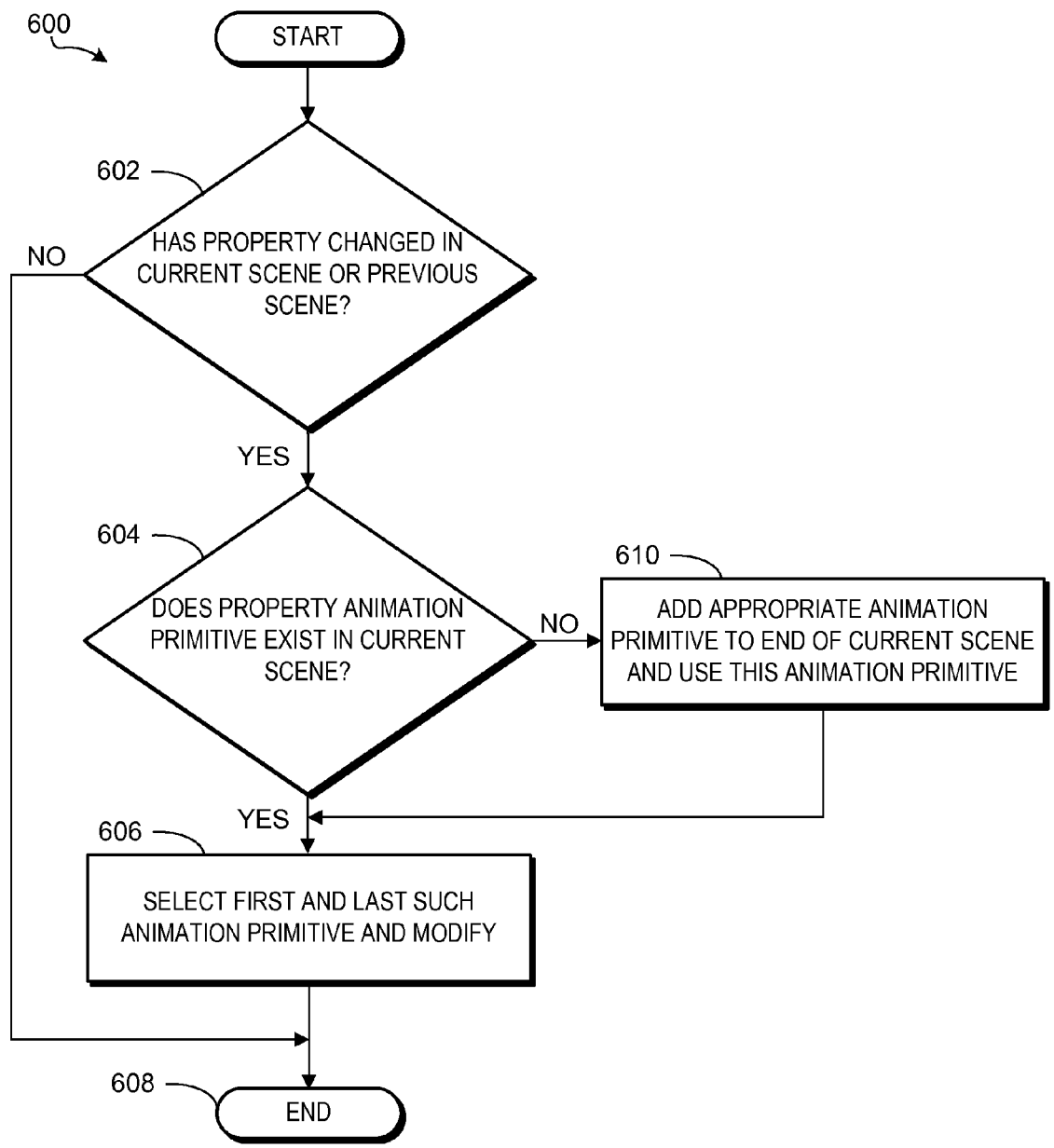
FIG. 6 is a flow diagram illustrating aspects of a method for applying changes to a scene, according to an illustrative embodiment.

FIG. 6 is a flow diagram illustrating aspects of a method 600 for applying changes to a scene, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

In some embodiments, animating a property in a scene propagates the change to the scenes positioned after that scene. In these embodiments, however, any property in a scene that has been edited may be absolute, meaning changes to the previous scenes do not affect that scene. For example, changing the size of an object in a second scene does not affect the same object in the third scene if that same object has had the size property changed in the third scene. However, if the third scene does not have an animation for position, changing the position of the object in the second scene does affect the third scene.

When a property is manipulated in a scene, the presentation application program either adds or modifies an animation to apply the animation effect associated with that animation. The method 600 provides an illustrative example of this logic.

The method 600 begins and proceeds to operation 602, wherein it is determined if a property has changed in a current scene or if a property has changed in a previous scene. If it is determined, at operation 602, that a property has changed in the current scene or a property has changed in the previous scene, the method 600 proceeds to operation 604. At operation 604, it is then determined if the property animation primitive exists in the current scene. If it is determined, at operation 604, that the property animation primitive exists in the current scene, the method 600 proceeds to operation 606. At operation 606, the first and last such animation primitive is selected and modified according to the change that was determined to have occurred in operation 602. The method 600 then proceeds to operation 608, wherein the method 600 ends.

If it is determined, at operation 604, that the property animation primitive does not exist in the current scene, the method 600 proceeds to operation 610. At operation 610, the appropriate animation primitive is added to the end of the current scene. The method 600 then proceeds to operation 606. At operation 606, the first and last such animation primitive is selected and modified according to the change that was determined to have occurred in operation 602. The method 600 then proceeds to operation 608, wherein the method 600 ends.

If it is determined, at operation 602, that a property has not changed in the current scene and a property has not changed in the previous scene, the method 600 proceeds to operation 608. The method 600 ends at operation 608.

Figure 7:
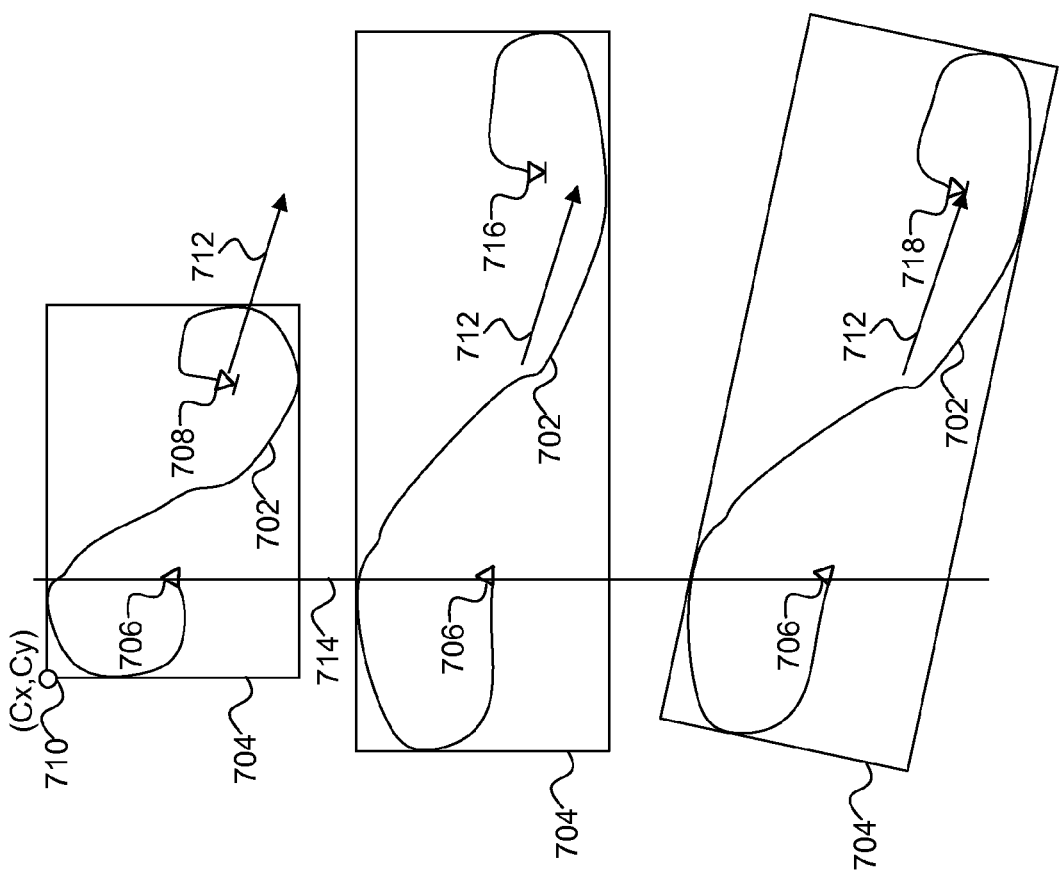
FIG. 7 is a diagram illustrating a visualization of a motion path tweening method, according to an illustrative embodiment.
Figure 8:
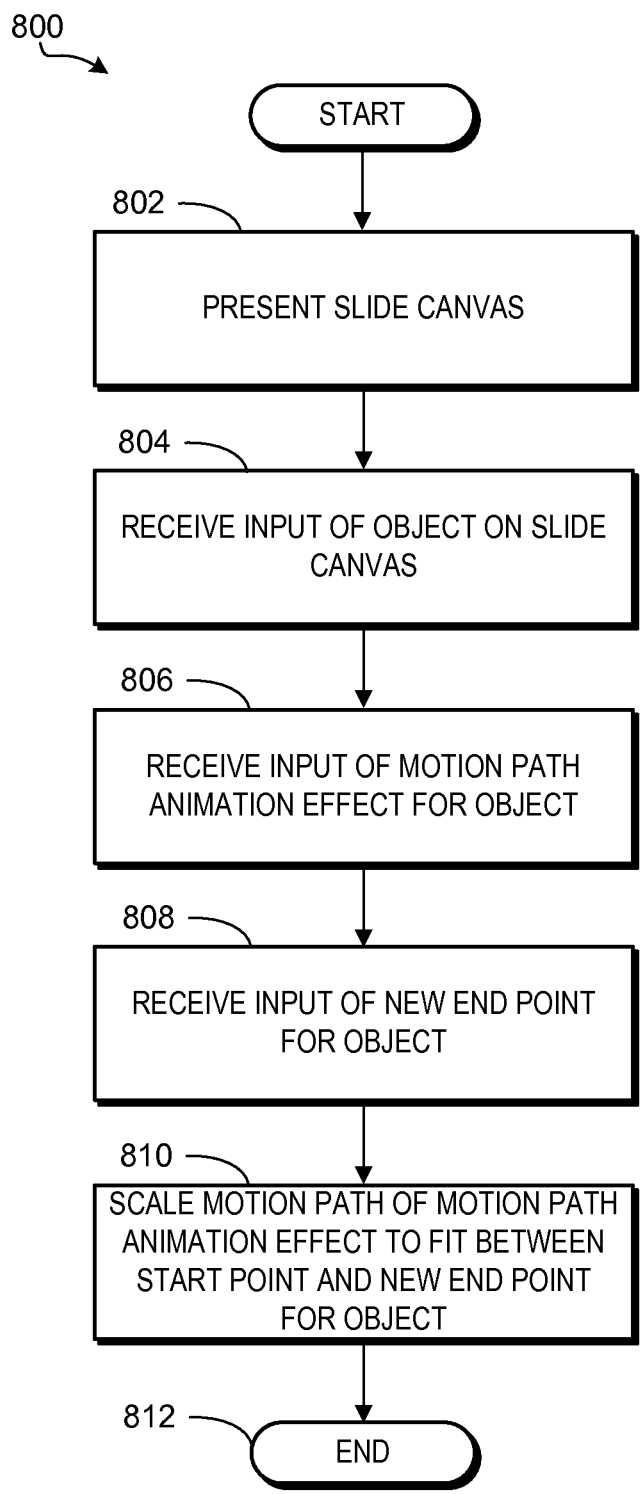
FIG. 8 is a flow diagram illustrating aspects of a method for motion path tweening, according to an illustrative embodiment.

FIG. 7 is a diagram illustrating a visualization 700 of a motion path tweening method, according to an illustrative embodiment. An illustrative method for motion path tweening is described below with reference to FIGS. 8 and 9. The visualization 700 includes the motion path 702, a bounding box 704 encompassing the motion path 702, a start point 706 of the motion path 702, an end point 708 of the motion path 702, a point (Cx, Cy) 710, a direction arrow 712, a vertical reference 714, an intermediate end point 716 of the motion path 702, and a final end point 718 of the motion path 702. The motion path 702 may be a non-linear motion path selected from a set of pre-defined motion paths for a motion path animation effect or a custom motion path created by a user.

The bounding box 704 includes a SetBoundRotate(angle) property defining an angle of rotation around the point (Cx, Cy) 710, a SetBoundPosition(x, y) defining x and y coordinates of the point (Cx, Cy) 710 on the slide canvas 108, and a SetBoundSize(width, height) defining a width and height of the bounding box 704. More generally, the bounding box 704 includes a bound rotation property defining an angle of rotation around a point along the edge of the bounding box 704, a bound position property defining an x coordinate and a y coordinate of the point, and a bound size property defining the size of the bounding box in width and height components.

The start point 706 is the starting position of an object to which a motion path animation effect including the motion path 702 has been applied. The start point 706 may be manipulated by a user, but in the illustrated embodiment remains in line with the vertical reference 714. The end point 708 is the ending position of the object. The point (Cx, Cy) 710 is a point of reference for various operations performed by the motion path tweening method described below. The direction arrow 712 indicates the direction towards the final end point 718 of the motion path 702. In the illustrated embodiment, the final end point 718 has been selected by a user and the motion path 702 is to be scaled to accommodate the final end point 718 while maintaining the shape of the motion path 702. A method 800 for motion path tweening to accomplish the above will now be described with reference to FIG. 8 and additional reference to FIG. 7.

The method 800 begins and proceeds to operation 802, wherein the slide canvas 108 is presented in the user interface 100 of the presentation application program. From operation 802, the method 800 proceeds to operation 804, wherein an input of an object is received on the slide canvas 108. From operation 804, the method 800 proceeds to operation 806, wherein an input of a motion path animation effect is received for the object.

In some embodiments, a visual representation of the motion path animation effect is shown on the slide canvas 108. The visual representation of the motion path animation effect includes a start point, a motion path, and an end point. For purposes of description, the motion path received in operation 806 will be described as the motion path 702 of FIG. 7. Accordingly, the start point and the end point of the motion path will be referred to as the start point 706 and the end point 708, respectively, of the motion path 702.

From operation 806, the method proceeds to operation 808, wherein a new end point is received for the object. The new end point may be received through a direct manipulation of the motion path 702 such that the end point 708 of the motion path 702 is moved to the final end point 718. In some embodiments, a new start point is additionally or alternatively received for the object. From operation 808, the method 800 proceeds to operation 810, wherein the motion path 702 is scaled to fit between the start point 706 and the final end point 718. The operation 810 is further described below with reference to a scaling subprocess 900 of FIG. 9. From operation 810, the method 800 proceeds to operation 812, wherein the method 800 ends.

Figure 9:
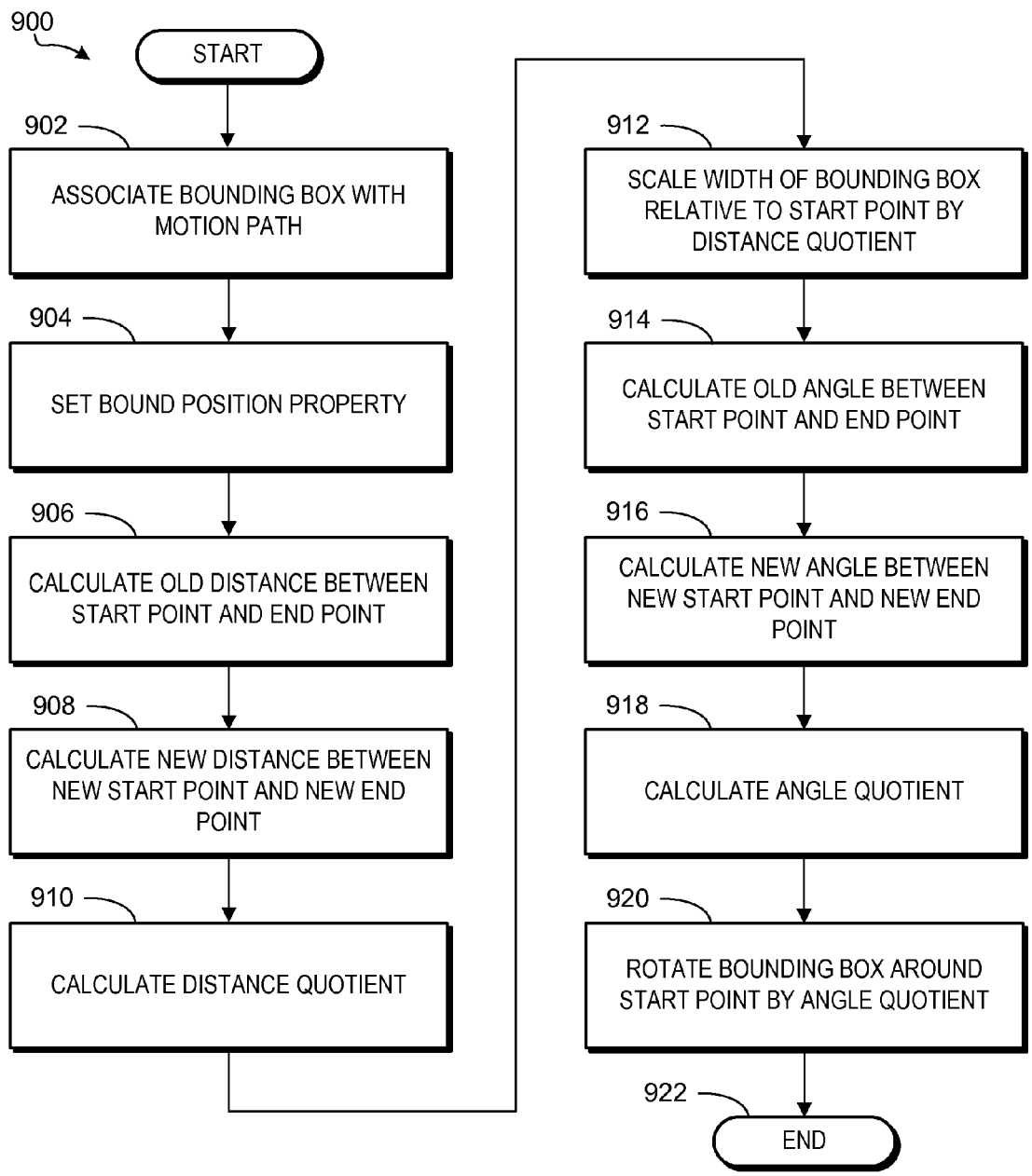
FIG. 9 is a flow diagram illustrating a scaling subprocess performed during an operation of the method described in FIG. 8, according to an illustrative embodiment.

FIG. 9 is a flow diagram illustrating the scaling subprocess 900 performed during operation 810 of the method 800 described above with reference to FIG. 8. The subprocess 900 utilizes the following utility methods for various calculations. A RotateBounds(angle, point) method is used to rotates the bounding box 704 around the point. A ScaleBounds(factorX, factorY, point) method is used to scale the bounding box 704 relative to the point. A GetStart method is used to return the start point of the motion path 704 relative to the point (Cx, Cy) 710. A GetEnd method is used to return the end point of the motion path 704 relative to the point (Cx, Cy) 712. The subprocess 900 will now be described with additional reference to FIG. 7 and to these utility methods to fit the motion path 702 from the start point 706 to the final end point 718.

The subprocess 900 begins and proceeds to operation 902, wherein the bounding box 704 is associated with the motion path 702. From operation 902, the subprocess proceeds to operation 904, the SetBoundPosition property is set. The SetBoundPosition property, as described above, includes x and y coordinates. At operation 904, the SetBoundPosition property is provided as SetBoundPosition(newStart.x-GetStart.x, newStart.y-GetStart.y), wherein newStart.x is a x coordinate value of a start point set for the motion path 702 after a manipulation, GetStart.x is a x coordinate value of the start point 706 for the motion path 702 before the manipulation, newStart.y is a y coordinate value of a start point set for the motion path 702 after the manipulation, and GetStart.y is a y coordinate value of the start point 706 after the manipulation. In FIG. 7, the start point 706 remains unchanged after a manipulation of the end point 708. Accordingly, in the illustrated embodiment, the GetStart x and y coordinate value are the same as the newStart x and y coordinate values. In some embodiments, however, the newStart x and/or y coordinate values are changed after the manipulation, in which case the appropriate values would be populated for the newStart method. As noted above, the coordinate values for the GetStart and GetEnd methods are calculated relative to the point (Cx, Cy) 710.

From operation 904, the subprocess 900 proceeds to operation 906, wherein a distance between the start point 706 and the end point 708 is calculated. This distance is referred to as the old distance, or oldDistance, which is defined as being equal to the distance between the value returned by the GetStart method and the GetEnd method. From operation 906, the subprocess 900 proceeds to operation 908, wherein a distance between the start point 706 and the final end point 718 is calculated. This distance is referred to as the new distance, or newDistance, which is defined as being equal to the distance between the value returned by the NewStart method and the NewEnd method.

From operation 908, the subprocess 900 proceeds to operation 910, wherein a distance quotient is calculated. The distance quotient is calculated as the newDistance divided by the oldDistance calculated, respectively, in operations 906 and 908. From operation 910, the method proceeds to operation 912, wherein the width of the bounding box 704 is scaled relative to the value returned by the GetStart method, or, in other words, the start point 706 relative to the point (Cx, Cy) 710. The width of the bounding box 704 is calculated utilizing the ScaleBounds method, wherein factorX is set to the distance quotient, factorY is set to 1.0, and the point is set to the value returned by the GetStart method.

From operation 912, the subprocess 900 proceeds to operation 914, wherein an angle between the start point 706 and the end point 708 is calculated. This angle is referred to as the old angle, or oldAngle, which is defined as being equal to the angle between the value returned by the GetStart method and the value returned by the GetEnd method. From operation 912, the subprocess 900 proceeds to operation 916, wherein an angle between the start point 706 and the final end point 718 is calculated. This angled is referred to as the new angle, or newAngle, which is defined as being equal to the angle between the value returned by the NewStart method and the value returned by the NewEnd method. From operation 916, the subprocess 900 proceeds to operation 918, wherein an angle quotient is calculated. The angle quotient is equal to the newAngle divided by the oldAngle.

From operation 916, the subprocess 900 proceeds to operation 920, wherein the RotateBounds method is utilized to rotate the bounding box 704 around the value returned by the GetStart method. The angle of rotation is calculated is set as the value returned in operation 918 for the angle quotient. From operation 920, the subprocess 900 proceeds to operation 922. The subprocess 900 ends at operation 922.

Figure 10:
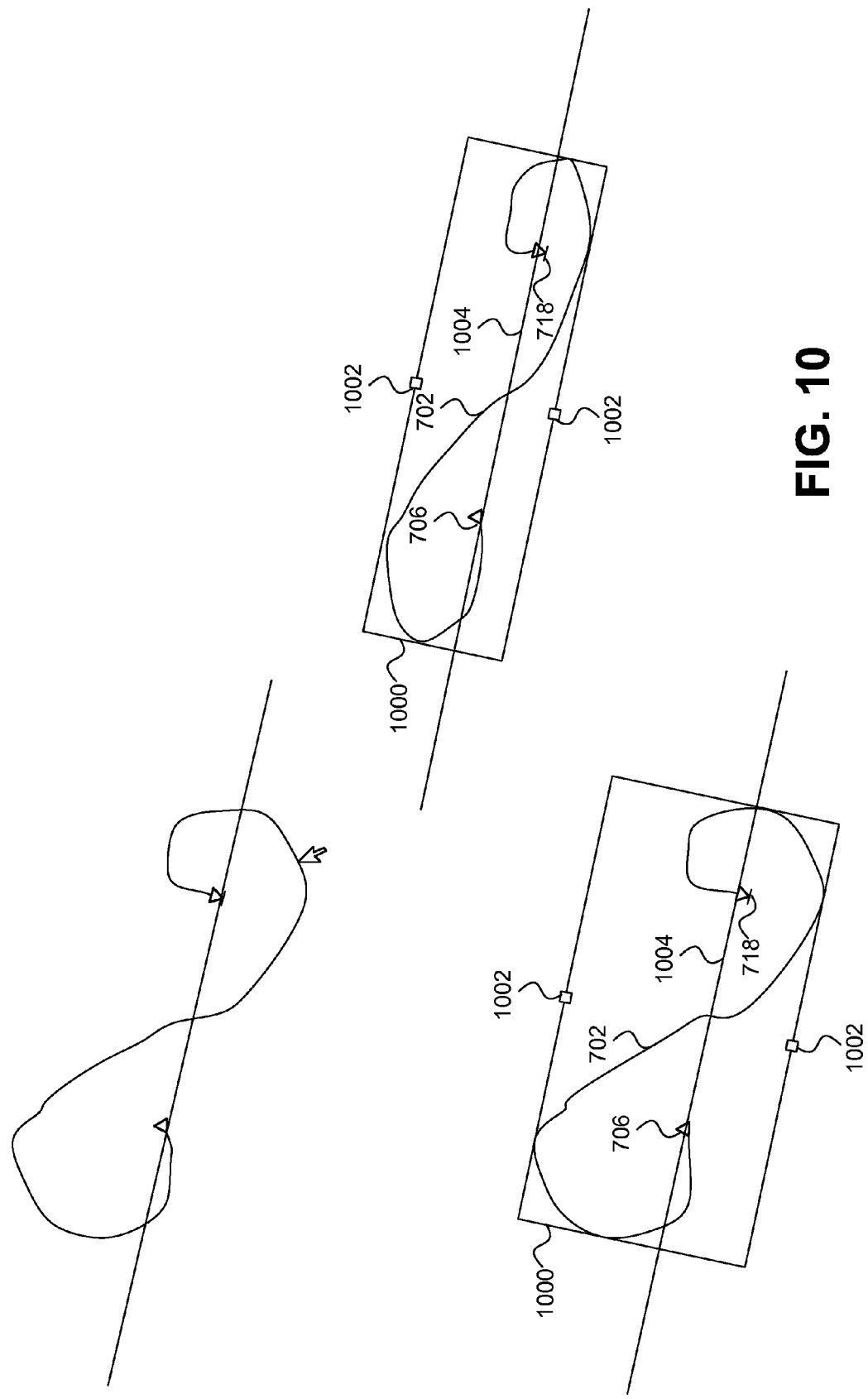
FIG. 10 is a diagram illustrating a motion path after the method described in FIG. 8 and the subprocess described in FIG. 9 have been performed and a mechanism for adjusting a height of the motion path, according to an illustrative embodiment.

FIG. 10 is a diagram illustrating the motion path 702 of FIG. 7 after the method 800 and the subprocess 900 of the method 900 have been performed. Upon selection of the motion path 702, a height adjustment box 1000 is displayed. The height adjustment box 1000 facilitates manipulation of the height of the motion path 702 by height adjustment handles 1002. Scaling the height of the motion path 702 causes an equally proportionate change of the top and bottom portions of the motion path 702 with respect to a line 1004 intersecting the start point 706 and the final end point 718. This ensures the start point 706 and the final end point 718 of the motion path remain the same. FIG. 10 illustrates the height of the motion path 702 before adjustment, after the height of the motion path 702 is decreased, and after the height of the motion path 702 is increased.

Figure 11:
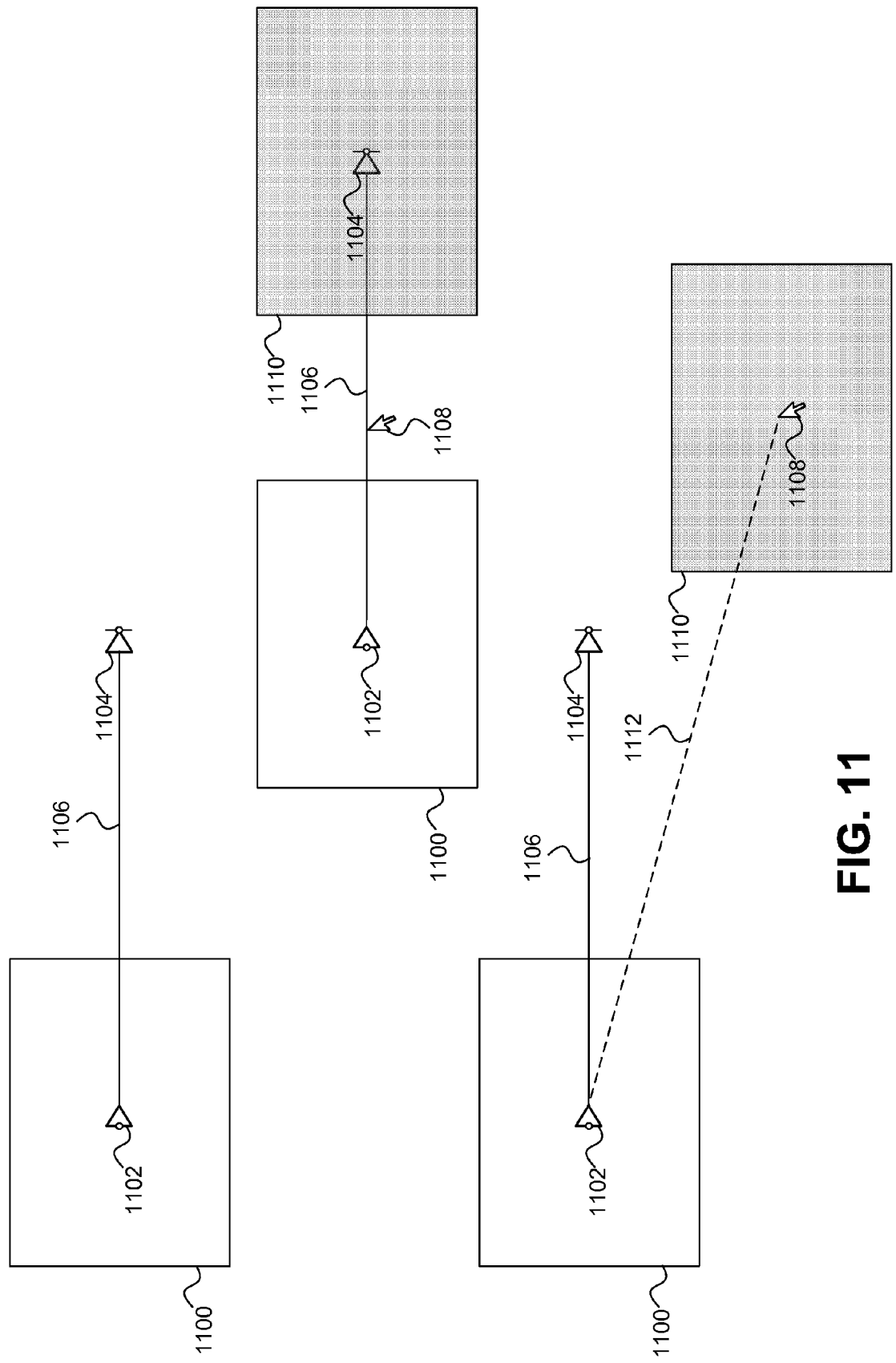
FIG. 11 is a diagram illustrating a mechanism for motion path visibility when directly manipulating objects on a slide canvas, according to an illustrative embodiment.

FIG. 11 is a diagram illustrating a mechanism for motion path visibility when directly manipulating objects on a slide canvas, according to an illustrative embodiment. In the illustrated embodiment, an object 1100 is displayed on a slide canvas, such as the slide canvas 108 described above with reference to FIG. 1. The object 1100 is associated with a motion path animation effect. The motion path animation effect includes a start point 1102, an end point 1104, and a motion path 1106. The motion path 1106 is illustrated as being linear, but other motion path shapes are contemplated.

If the motion path animation effect is selected, for example, with a cursor 1108, a ghost version 1110 of the object 1100 is generated and is shown on the slide canvas 108. The ghost version 1110 represents where on the slide canvas 108 the object 1100 will appear when the motion path animation effect is performed. The end point 1104 may be dragged to a new position on the slide canvas 108. The ghost version 1110 of the object 1100 is shown over the new position. If the new position is confirmed, for example, by releasing a mouse button or removing a finger from a touchscreen to end a drag gesture, the end point 1104 is repositioned at the new position and the ghost version 1110 is shown in the new position. The ghost version may also be used to show a start position when a start point is manipulated.

It should be understood that the ghost version 1110 of the object may be transparent, semi-transparent, colored, emphasized, deemphasized, or in some other way visually differentiated from the object 1100. As such, the illustrated embodiment of a semi-transparent ghost version is not intended to be limiting in any way. It should also be understood that the ghost version 1110 need not be positioned such that the end point 1104 is in the center of the ghost version 1110 as in the illustrated embodiment. Instead, the ghost version 1110 may be in proximity to the end point 1104. The ghost version 1110 being in proximity to the end point 1104 includes the ghost version 1110 at least partially intersecting the end point 1104 or being within a pre-defined distance from the end point 1104 such that it would be apparent to a user where the end position of the object 1100 would be after the motion path animation effect is performed.

Figure 12:
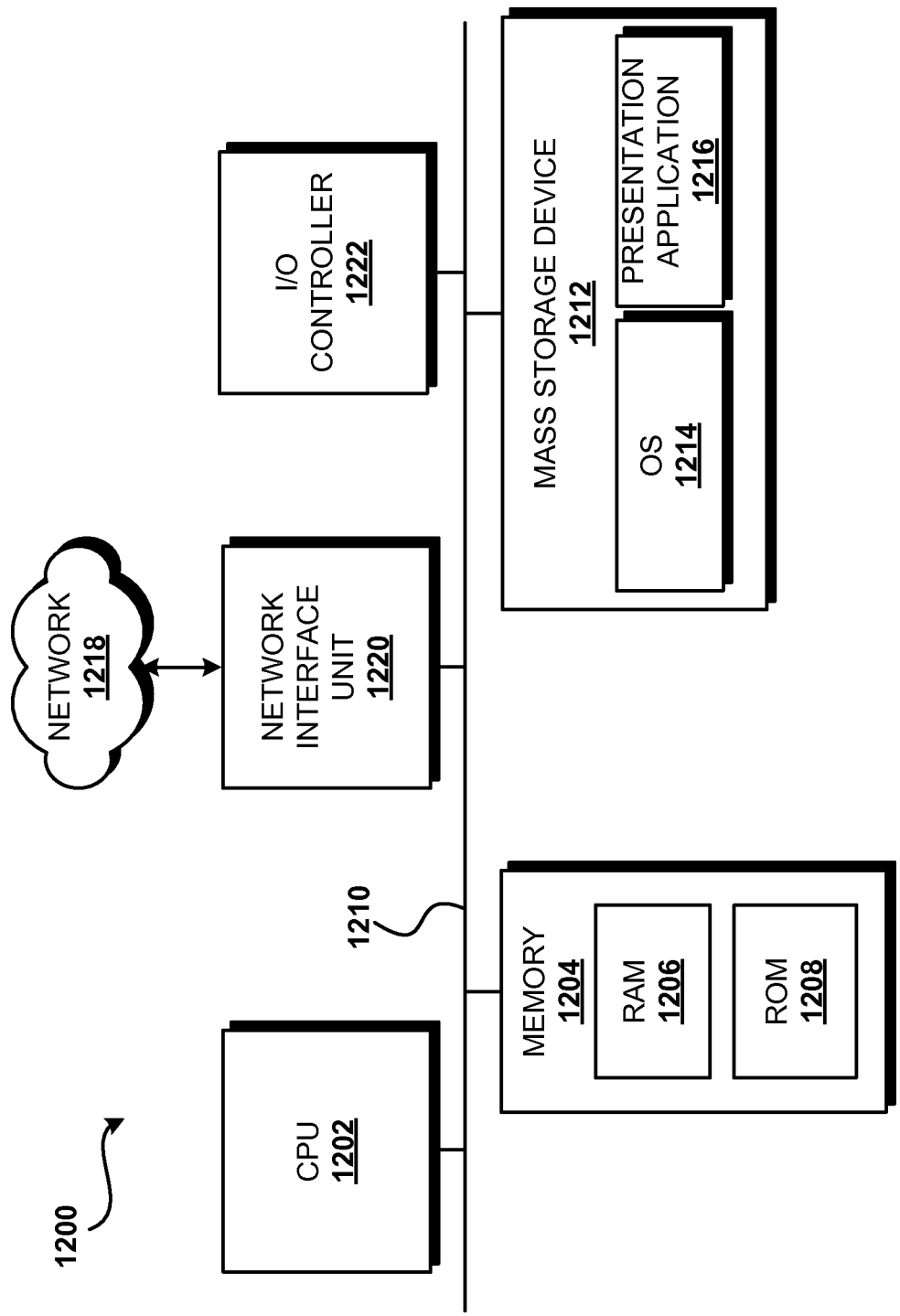
FIG. 12 is a computer architecture diagram illustrating an illustrative computer hardware and software architecture for a computing system capable of implementing aspects of the embodiments presented herein.

FIG. 12 illustrates an illustrative computer architecture 1200 for a device capable of executing the software components described herein for creating and managing animations. Thus, the computer architecture 1200 illustrated in FIG. 12 illustrates an architecture for a server computer, mobile phone, a PDA, a smart phone, a desktop computer, a netbook computer, a tablet computer, and/or a laptop computer. The computer architecture 1200 may be utilized to execute any aspects of the software components presented herein.

The computer architecture 1200 illustrated in FIG. 12 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system containing the basic routines that help to transfer information between elements within the computer architecture 1200, such as during startup, is stored in the ROM 1208. The computer architecture 1200 further includes a mass storage device 1212 for storing an operating system 1214 and one or more application programs including, but not limited to, a presentation application program 1216.

The mass storage device 1212 is connected to the CPU 1202 through a mass storage controller (not shown) connected to the bus 1210. The mass storage device 1212 and its associated computer-readable media provide non-volatile storage for the computer architecture 1200. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes the claims, the phrase "computer storage medium" and variations thereof, does not include waves, signals, and/or other transitory and/or intangible communication media, per se.

According to various embodiments, the computer architecture 1200 may operate in a networked environment using logical connections to remote computers through a network 1218. The computer architecture 1200 may connect to the network 1218 through a network interface unit 1220 connected to the bus 1210. It should be appreciated that the network interface unit 1220 also may be utilized to connect to other types of networks and remote computer systems. The computer architecture 1200 also may include an input/output controller 1222 for receiving and processing input from a number of other devices, including a keyboard, mouse, or electronic stylus (not shown in FIG. 12). Similarly, the input/output controller 1222 may provide output to a display screen, a printer, or other type of output device (also not shown in FIG. 12).

It should be appreciated that the software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 may include other types of computing devices, including hand-held computers, embedded computer systems, personal digital assistants, and other types of computing devices known to those skilled in the art. It is also contemplated that the computer architecture 1200 may not include all of the components shown in FIG. 12, may include other components that are not explicitly shown in FIG. 12, or may utilize an architecture completely different than that shown in FIG. 12.

Figure 13:
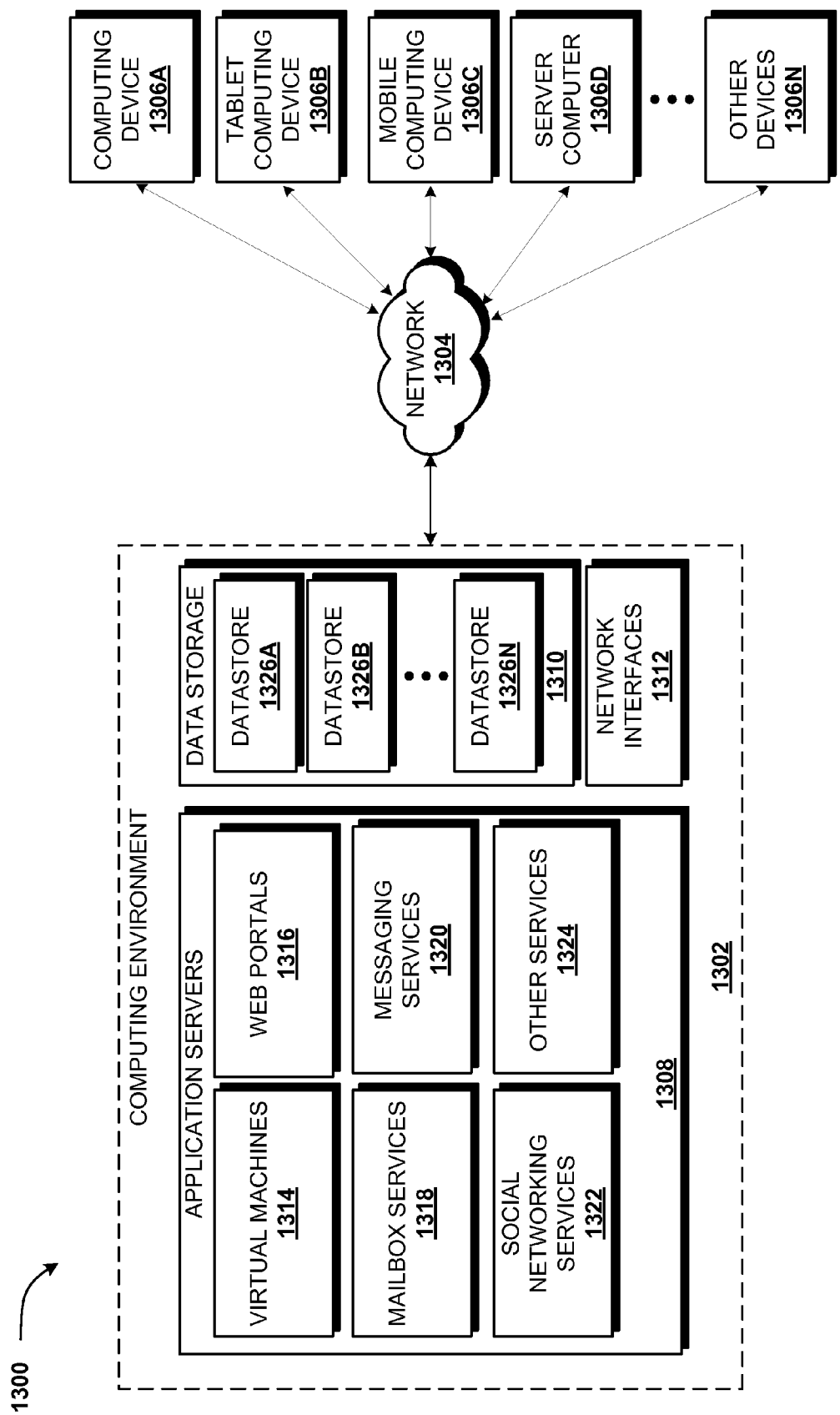
FIG. 13 is a diagram illustrating a distributed computing environment capable of implementing aspects of the embodiments presented herein.

FIG. 13 illustrates an illustrative distributed computing environment 1300 capable of executing the software components described herein for creating and managing animations in a presentation application program. Thus, the distributed computing environment 1300 illustrated in FIG. 13 can be utilized to execute any aspects of the software components presented herein. For example, the distributed computing environment 1300 can be utilized to execute aspects of the presentation application program described herein.

According to various implementations, the distributed computing environment 1300 includes a computing environment 1302 operating on, in communication with, or as part of the network 1304. The network 1304 also can include various access networks. One or more client devices 1306A-1306N (hereinafter referred to collectively and/or generically as "clients 1306") can communicate with the computing environment 1302 via the network 1304 and/or other connections (not illustrated in FIG. 13). In the illustrated embodiment, the clients 1306 include a computing device 1306A such as a laptop computer, a desktop computer, or other computing device; a slate or tablet computing device ("tablet computing device") 1306B; a mobile computing device 1306C such as a mobile telephone, a smart phone, or other mobile computing device; a server computer 1306D; and/or other devices 1306N. It should be understood that any number of clients 1306 can communicate with the computing environment 1302. Two example computing architectures for the clients 1306 are illustrated and described herein with reference to FIGS. 12 and 14. It should be understood that the illustrated clients 1306 and computing architectures illustrated and described herein are illustrative, and should not be construed as being limited in any way.

In the illustrated embodiment, the computing environment 1302 includes application servers 1308, data storage 1310, and one or more network interfaces 1312. According to various implementations, the functionality of the application servers 1308 can be provided by one or more server computers that are executing as part of, or in communication with, the network 1304. The application servers 1308 can host various services, virtual machines, portals, and/or other resources. In the illustrated embodiment, the application servers 1308 host one or more virtual machines 1314 for hosting applications or other functionality. According to various implementations, the virtual machines 1314 host one or more applications and/or software modules for providing the functionality described herein for creating and managing animations in a presentation application program. It should be understood that this embodiment is illustrative, and should not be construed as being limiting in any way. The application servers 1308 also host or provide access to one or more Web portals, link pages, Web sites, and/or other information ("Web portals") 1316.

According to various implementations, the application servers 1308 also include one or more mailbox services 1318 and one or more messaging services 1320. The mailbox services 1318 can include electronic mail ("email") services. The mailbox services 1318 also can include various personal information management ("PIM") services including, but not limited to, calendar services, contact management services, collaboration services, and/or other services. The messaging services 1320 can include, but are not limited to, instant messaging services, chat services, forum services, and/or other communication services.

The application servers 1308 also can include one or more social networking services 1322. The social networking services 1322 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 1322 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 1322 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1322 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1322 are not mentioned herein for the sake of brevity. As such, the above embodiments are illustrative, and should not be construed as being limited in any way.

As shown in FIG. 13, the application servers 1308 also can host other services, applications, portals, and/or other resources ("other resources") 1324. The other resources 1324 can include, but are not limited to, the presentation application program. It thus can be appreciated that the computing environment 1302 can provide integration of the concepts and technologies disclosed herein provided herein for creating and managing animations with various mailbox, messaging, social networking, and/or other services or resources. For example, the concepts and technologies disclosed herein may utilize objects retrieved from various mailbox, messaging, social network, and/or other service or resources for insertion into one or more slides and/or one or more scenes. Animations may be authored for these objects. Moreover, custom animations may be retrieved from these services or resources.

As mentioned above, the computing environment 1302 can include the data storage 1310. According to various implementations, the functionality of the data storage 1310 is provided by one or more databases operating on, or in communication with, the network 1304. The functionality of the data storage 1310 also can be provided by one or more server computers configured to host data for the computing environment 1302. The data storage 1310 can include, host, or provide one or more real or virtual datastores 1326A-1326N (hereinafter referred to collectively and/or generically as "datastores 1326"). The datastores 1326 are configured to host data used or created by the application servers 1308 and/or other data. Although not illustrated in FIG. 13, the datastores 1326 also can host or store objects, animations, and/or other data utilized by a presentation application program.

The computing environment 1302 can communicate with, or be accessed by, the network interfaces 1312. The network interfaces 1312 can include various types of network hardware and software for supporting communications between two or more computing devices including, but not limited to, the clients 1306 and the application servers 1308. It should be appreciated that the network interfaces 1312 also may be utilized to connect to other types of networks and/or computer systems.

It should be understood that the distributed computing environment 1300 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1300 provides the software functionality described herein as a service to the clients 1306. It should be understood that the clients 1306 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1300 to utilize the functionality described herein for creating and managing animations in a presentation application program.

Figure 14:
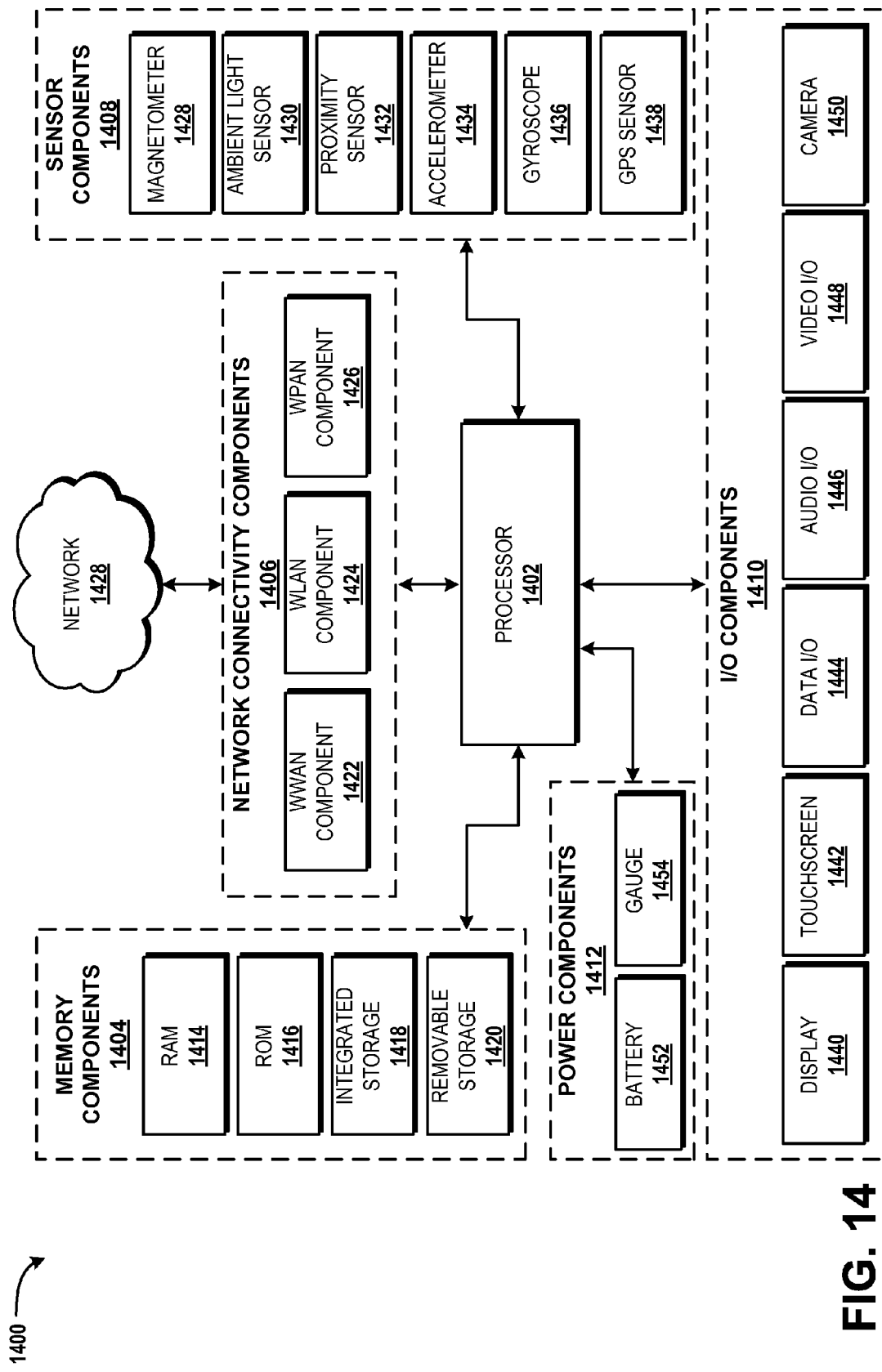
FIG. 14 is a computer architecture diagram illustrating a computing device architecture capable of implementing aspects of the embodiments presented herein.

Turning now to FIG. 14, an illustrative computing device architecture 1400 for a computing device that is capable of executing various software components described herein for creating and managing animations in a presentation application program. The computing device architecture 1400 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. The computing device architecture 1400 is applicable to any of the clients 1306 shown in FIG. 13. Moreover, aspects of the computing device architecture 1400 may be applicable to traditional desktop computers, portable computers (e.g., laptops, notebooks, ultra-portables, and netbooks), server computers, and other computer systems, such as described herein with reference to FIG. 12. For example, the single touch and multi-touch aspects disclosed herein below may be applied to desktop computers that utilize a touchscreen or some other touch-enabled device, such as a touch-enabled track pad or touch-enabled mouse.

The computing device architecture 1400 illustrated in FIG. 14 includes a processor 1402, memory components 1404, network connectivity components 1406, sensor components 1408, input/output components 1410, and power components 1412. In the illustrated embodiment, the processor 1402 is in communication with the memory components 1404, the network connectivity components 1406, the sensor components 1408, the input/output ("I/O") components 1410, and the power components 1412. Although no connections are shown between the individuals components illustrated in FIG. 14, the components can interact to carry out device functions. In some embodiments, the components are arranged so as to communicate via one or more busses (not shown).

The processor 1402 includes a central processing unit ("CPU") configured to process data, execute computer-executable instructions of one or more application programs, and communicate with other components of the computing device architecture 1400 in order to perform various functionality described herein. The processor 1402 may be utilized to execute aspects of the software components presented herein and, particularly, those that utilize, at least in part, a touch-enabled input.

In some embodiments, the processor 1402 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and higher resolution), video games, three-dimensional ("3D") modeling applications, and the like. In some embodiments, the processor 1402 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 1402 is, or is included in, a system-on-chip ("SoC") along with one or more of the other components described herein below. For example, the SoC may include the processor 1402, a GPU, one or more of the network connectivity components 1406, and one or more of the sensor components 1408. In some embodiments, the processor 1402 is fabricated, in part, utilizing a package-on-package ("PoP") integrated circuit packaging technique. Moreover, the processor 1402 may be a single core or multi-core processor.

The processor 1402 may be created in accordance with an ARM architecture, available for license from ARM HOLDINGS of Cambridge, United Kingdom. Alternatively, the processor 1402 may be created in accordance with an x86 architecture, such as is available from INTEL CORPORATION of Mountain View, Calif. and others. In some embodiments, the processor 1402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1404 include a random access memory ("RAM") 1414, a read-only memory ("ROM") 1416, an integrated storage memory ("integrated storage") 1418, and a removable storage memory ("removable storage") 1420. In some embodiments, the RAM 1414 or a portion thereof, the ROM 1416 or a portion thereof, and/or some combination the RAM 1414 and the ROM 1416 is integrated in the processor 1402. In some embodiments, the ROM 1416 is configured to store a firmware, an operating system or a portion thereof (e.g., operating system kernel), and/or a bootloader to load an operating system kernel from the integrated storage 1418 or the removable storage 1420.

The integrated storage 1418 can include a solid-state memory, a hard disk, or a combination of solid-state memory and a hard disk. The integrated storage 1418 may be soldered or otherwise connected to a logic board upon which the processor 1402 and other components described herein also may be connected. As such, the integrated storage 1418 is integrated in the computing device. The integrated storage 1418 is configured to store an operating system or portions thereof, application programs, data, and other software components described herein.

The removable storage 1420 can include a solid-state memory, a hard disk, or a combination of solid-state memory and a hard disk. In some embodiments, the removable storage 1420 is provided in lieu of the integrated storage 1418. In other embodiments, the removable storage 1420 is provided as additional optional storage. In some embodiments, the removable storage 1420 is logically combined with the integrated storage 1418 such that the total available storage is made available and shown to a user as a total combined capacity of the integrated storage 1418 and the removable storage 1420.

The removable storage 1420 is configured to be inserted into a removable storage memory slot (not shown) or other mechanism by which the removable storage 1420 is inserted and secured to facilitate a connection over which the removable storage 1420 can communicate with other components of the computing device, such as the processor 1402. The removable storage 1420 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1404 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1406 include a wireless wide area network component ("WWAN component") 1422, a wireless local area network component ("WLAN component") 1424, and a wireless personal area network component ("WPAN component") 1426. The network connectivity components 1406 facilitate communications to and from a network 1428, which may be a WWAN, a WLAN, or a WPAN. Although a single network 1428 is illustrated, the network connectivity components 1406 may facilitate simultaneous communication with multiple networks. For example, the network connectivity components 1406 may facilitate simultaneous communications with multiple networks via one or more of a WWAN, a WLAN, or a WPAN.

The network 1428 may be a WWAN, such as a mobile telecommunications network utilizing one or more mobile telecommunications technologies to provide voice and/or data services to a computing device utilizing the computing device architecture 1400 via the WWAN component 1422. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1428 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1428 may be configured to provide voice and/or data communications with any combination of the above technologies. The network 1428 may be configured to or adapted to provide voice and/or data communications in accordance with future generation technologies.

In some embodiments, the WWAN component 1422 is configured to provide dual-multi-mode connectivity to the network 1428. For example, the WWAN component 1422 may be configured to provide connectivity to the network 1428, wherein the network 1428 provides service via GSM and UMTS technologies, or via some other combination of technologies. Alternatively, multiple WWAN components 1422 may be utilized to perform such functionality, and/or provide additional functionality to support other non-compatible technologies (i.e., incapable of being supported by a single WWAN component). The WWAN component 1422 may facilitate similar connectivity to multiple networks (e.g., a UMTS network and an LTE network).

The network 1428 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 1424 is configured to connect to the network 1428 via the WI-FI access points. Such connections may be secured via various encryption technologies including, but not limited, WI-FI Protected Access ("WPA"), WPA2, Wired Equivalent Privacy ("WEP"), and the like.

The network 1428 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 1426 is configured to facilitate communications with other devices, such as peripherals, computers, or other computing devices via the WPAN.

The sensor components 1408 include a magnetometer 1428, an ambient light sensor 1430, a proximity sensor 1432, an accelerometer 1434, a gyroscope 1436, and a Global Positioning System sensor ("GPS sensor") 1438. It is contemplated that other sensors, such as, but not limited to, temperature sensors or shock detection sensors, also may be incorporated in the computing device architecture 1400.

The magnetometer 1428 is configured to measure the strength and direction of a magnetic field. In some embodiments the magnetometer 1428 provides measurements to a compass application program stored within one of the memory components 1404 in order to provide a user with accurate directions in a frame of reference including the cardinal directions, north, south, east, and west. Similar measurements may be provided to a navigation application program that includes a compass component. Other uses of measurements obtained by the magnetometer 1428 are contemplated.

The ambient light sensor 1430 is configured to measure ambient light. In some embodiments, the ambient light sensor 1430 provides measurements to an application program stored within one the memory components 1404 in order to automatically adjust the brightness of a display (described below) to compensate for low-light and high-light environments. Other uses of measurements obtained by the ambient light sensor 1430 are contemplated.

The proximity sensor 1432 is configured to detect the presence of an object or thing in proximity to the computing device without direct contact. In some embodiments, the proximity sensor 1432 detects the presence of a user's body (e.g., the user's face) and provides this information to an application program stored within one of the memory components 1404 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1432 are contemplated.

The accelerometer 1434 is configured to measure proper acceleration. In some embodiments, output from the accelerometer 1434 is used by an application program as an input mechanism to control some functionality of the application program. For example, the application program may be a video game in which a character, a portion thereof, or an object is moved or otherwise manipulated in response to input received via the accelerometer 1434. In some embodiments, output from the accelerometer 1434 is provided to an application program for use in switching between landscape and portrait modes, calculating coordinate acceleration, or detecting a fall. Other uses of the accelerometer 1434 are contemplated.

The gyroscope 1436 is configured to measure and maintain orientation. In some embodiments, output from the gyroscope 1436 is used by an application program as an input mechanism to control some functionality of the application program. For example, the gyroscope 1436 can be used for accurate recognition of movement within a 3D environment of a video game application or some other application. In some embodiments, an application program utilizes output from the gyroscope 1436 and the accelerometer 1434 to enhance control of some functionality of the application program. Other uses of the gyroscope 1436 are contemplated.

The GPS sensor 1436 is configured to receive signals from GPS satellites for use in calculating a location. The location calculated by the GPS sensor 1438 may be used by any application program that requires or benefits from location information. For example, the location calculated by the GPS sensor 1438 may be used with a navigation application program to provide directions from the location to a destination or directions from the destination to the location. Moreover, the GPS sensor 1438 may be used to provide location information to an external location-based service, such as E911 service. The GPS sensor 1438 may obtain location information generated via WI-FI, WIMAX, and/or cellular triangulation techniques utilizing one or more of the network connectivity components 1406 to aid the GPS sensor 1438 in obtaining a location fix. The GPS sensor 1438 may also be used in Assisted GPS ("A-GPS") systems.

The I/O components 1410 include a display 1440, a touchscreen 1442, a data I/O interface component ("data I/O") 1444, an audio I/O interface component ("audio I/O") 1446, a video I/O interface component ("video I/O") 1448, and a camera 1450. In some embodiments, the display 1440 and the touchscreen 1442 are combined. In some embodiments two or more of the data I/O component 1444, the audio I/O component 1446, and the video I/O component 1448 are combined. The I/O components 1410 may include discrete processors configured to support the various interface described below, or may include processing functionality built-in to the processor 1402.

The display 1440 is an output device configured to present information in a visual form. In particular, the display 1440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 1440 is a liquid crystal display ("LCD") utilizing any active or passive matrix technology and any backlighting technology (if used). In some embodiments, the display 1440 is an organic light emitting diode ("OLED") display. Other display types are contemplated.

The touchscreen 1442 is an input device configured to detect the presence and location of a touch. The touchscreen 1442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 1442 is incorporated on top of the display 1440 as a transparent layer to enable a user to use one or more touches to interact with objects or other information presented on the display 1440. In other embodiments, the touchscreen 1442 is a touch pad incorporated on a surface of the computing device that does not include the display 1440. For example, the computing device may have a touchscreen incorporated on top of the display 1440 and a touch pad on a surface opposite the display 1440.

In some embodiments, the touchscreen 1442 is a single-touch touchscreen. In other embodiments, the touchscreen 1442 is a multi-touch touchscreen. In some embodiments, the touchscreen 1442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1442. As such, a developer may create gestures that are specific to a particular application program.

In some embodiments, the touchscreen 1442 supports a tap gesture in which a user taps the touchscreen 1442 once on an item presented on the display 1440. The tap gesture may be used for various reasons including, but not limited to, opening or launching whatever the user taps. In some embodiments, the touchscreen 1442 supports a double tap gesture in which a user taps the touchscreen 1442 twice on an item presented on the display 1440. The double tap gesture may be used for various reasons including, but not limited to, zooming in or zooming out in stages. In some embodiments, the touchscreen 1442 supports a tap and hold gesture in which a user taps the touchscreen 1442 and maintains contact for at least a pre-defined time. The tap and hold gesture may be used for various reasons including, but not limited to, opening a context-specific menu.

In some embodiments, the touchscreen 1442 supports a pan gesture in which a user places a finger on the touchscreen 1442 and maintains contact with the touchscreen 1442 while moving the finger on the touchscreen 1442. The pan gesture may be used for various reasons including, but not limited to, moving through screens, images, or menus at a controlled rate. Multiple finger pan gestures are also contemplated. In some embodiments, the touchscreen 1442 supports a flick gesture in which a user swipes a finger in the direction the user wants the screen to move. The flick gesture may be used for various reasons including, but not limited to, scrolling horizontally or vertically through menus or pages. In some embodiments, the touchscreen 1442 supports a pinch and stretch gesture in which a user makes a pinching motion with two fingers (e.g., thumb and forefinger) on the touchscreen 1442 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1442. As such, the above gestures should be understood as being illustrative and should not be construed as being limiting in any way.

Figure 15:
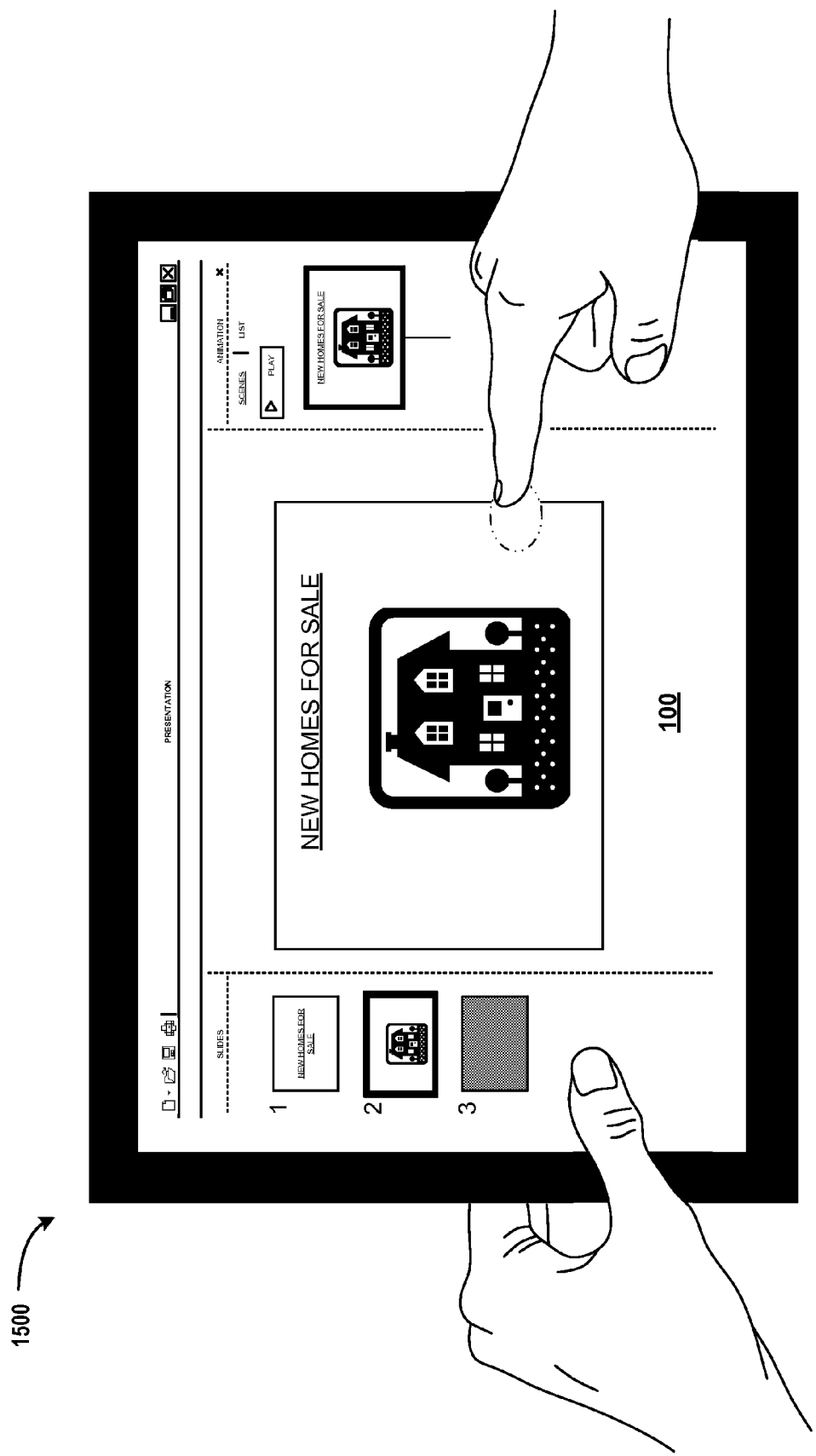
FIG. 15 is a diagram illustrating an exemplary tablet device with a user interface diagram being shown on a display of the tablet device in a landscape mode, according to an illustrative embodiment.

In some embodiments, interaction with the user interface 100 and portions thereof, such as the animation pane 106, as described above with reference to FIGS. 1 and 2, and input for the direct manipulation of objects to create animations in accordance with the various aspects disclosed herein, may be facilitated via the touchscreen 1442. Referring briefly to FIG. 15, an exemplary tablet device 1500 is illustrated with the user interface 100 being shown on a display of the tablet device 1500 in a landscape mode. The display of the tablet device 1500 is or includes a touchscreen, such as the touchscreen 1442. As such, the tablet device 1500 is configured to receive a touch input 1502 to interact with the user interface 100. Although the touch input 1502 is illustrated as a single discrete touch, the touch input 1502 alternatively may be multiple discrete touches, a single touch gesture, or a multi-touch gesture, such as those described above.

The data I/O interface component 1444 is configured to facilitate input of data to the computing device and output of data from the computing device. In some embodiments, the data I/O interface component 1444 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 1446 is configured to provide audio input and/or output capabilities to the computing device. In some embodiments, the audio I/O interface component 1444 includes a microphone configured to collect audio signals. In some embodiments, the audio I/O interface component 1444 includes a headphone jack configured to provide connectivity for headphones or other external speakers. In some embodiments, the audio interface component 1446 includes a speaker for the output of audio signals. In some embodiments, the audio I/O interface component 1444 includes an optical audio cable out.

The video I/O interface component 1448 is configured to provide video input and/or output capabilities to the computing device. In some embodiments, the video I/O interface component 1448 includes a video connector configured to receive video as input from another device (e.g., a video media player such as a DVD or BLURAY player) or send video as output to another device (e.g., a monitor, a television, or some other external display). In some embodiments, the video I/O interface component 1448 includes a High-Definition Multimedia Interface ("HDMI"), mini-HDMI, micro-HDMI, DisplayPort, or proprietary connector to input/output video content. In some embodiments, the video I/O interface component 1448 or portions thereof is combined with the audio I/O interface component 1446 or portions thereof.

The camera 1450 can be configured to capture still images and/or video. The camera 1450 may utilize a charge coupled device ("CCD") or a complementary metal oxide semiconductor ("CMOS") image sensor to capture images. In some embodiments, the camera 1450 includes a flash to aid in taking pictures in low-light environments. Settings for the camera 1450 may be implemented as hardware or software buttons.

Although not illustrated, one or more hardware buttons may also be included in the computing device architecture 1400. The hardware buttons may be used for controlling some operational aspect of the computing device. The hardware buttons may be dedicated buttons or multi-use buttons. The hardware buttons may be mechanical or sensor-based.

The illustrated power components 1412 include one or more batteries 1452, which can be connected to a battery gauge 1454. The batteries 1452 may be rechargeable or disposable. Rechargeable battery types include, but are not limited to, lithium polymer, lithium ion, nickel cadmium, and nickel metal hydride. Each of the batteries 1452 may be made of one or more cells.

The battery gauge 1454 can be configured to measure battery parameters such as current, voltage, and temperature. In some embodiments, the battery gauge 1454 is configured to measure the effect of a battery's discharge rate, temperature, age and other factors to predict remaining life within a certain percentage of error. In some embodiments, the battery gauge 1454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1412 may also include a power connector, which may be combined with one or more of the aforementioned I/O components 1410. The power components 1412 may interface with an external power system or charging equipment via a power I/O component.

Based on the foregoing, it should be appreciated that concepts and technologies for have been disclosed herein for creating and managing animations in a presentation application program. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for generating one or more discrete states for an animation timeline, the computer-implemented method comprising computer-implemented operations for:

analyzing, by a presentation application program executing on a computer, a plurality of animation effects in the animation timeline to determine the one or more discrete states to be generated for the animation timeline by analyzing which of the plurality of animation effects in the animation timeline are triggered by a pre-configured trigger or a user-controlled trigger, wherein an animation effect that is triggered by the pre-configured trigger or the user-controlled trigger indicates a start of one of the one or more discrete states;

generating, by the presentation application program executing on the computer, the one or more discrete states for the animation timeline, the one or more discrete states comprising one or more of the plurality of animation effects;

presenting a slide selection pane comprising one or more slides in a user interface; and presenting an animation pane in the user interface, the animation pane comprising a scenes view comprising thumbnails corresponding to the one or more discrete states.

2. The computer-implemented method of claim 1, wherein the thumbnails further comprise one or more objects configured in a layout, and wherein the plurality of animation effects are associated with the one or more objects.

3. The computer-implemented method of claim 2, wherein the scenes view comprises scene numbers associated with the thumbnails.

4. The computer-implemented method of claim 3, wherein the scenes view further comprises an indication of whether a scene associated with one of the thumbnails is triggered by a mouse click.

5. The computer-implemented method of claim 4, wherein the scenes view further comprises a visual representation of linearity to a next scene.

6. The computer-implemented method of claim 5, wherein the scenes view further comprises a transparent scene thumbnail that, upon selection, opens up a temporary new scene.

7. The computer-implemented method of claim 6, further comprising:
receiving a selection of the transparent scene thumbnail;
opening up the temporary new scene;
receiving a user input comprising a new animation effect in the temporary new scene;
creating a new discrete state in the animation timeline, the new discrete state comprising the new animation effect; and
creating a new scene from the temporary new scene, the new scene comprising the new animation effect and the new scene being a visualization for the new discrete state in the animation timeline.

8. The computer-implemented method of claim 7, wherein the user input comprises a direct manipulation of an object in the temporary new scene, the direct manipulation comprising a creation of a motion path for the object.

9. An apparatus for generating one or more discrete states for an animation timeline comprising:
a processor;
a memory communicatively coupled to the processor; and
a program module which executes in the processor from the memory and which, when executed by the processor, causes the processor to
analyze a plurality of animation effects in the animation timeline to determine the one or more discrete states to be generated for the animation timeline by analyzing which of the plurality of animation effects in the animation timeline are triggered by a pre-configured trigger or a user-controlled trigger, wherein an animation effect that is triggered by the pre-configured trigger or the user-controlled trigger indicates a start of one of the one or more discrete states,
generate the one or more discrete states for the animation timeline, the one or more discrete states comprising one or more of the plurality of animation effects,
present a slide selection pane comprising one or more slides in a user interface, and
present an animation pane in the user interface, the animation pane comprising a scenes view comprising thumbnails corresponding to the one or more discrete states.

10. The apparatus of claim 9, wherein the thumbnails further comprise one or more objects configured in a layout, and wherein one or more of the plurality of animation effects are associated with the one or more objects.

11. The apparatus of claim 10, wherein the scenes view comprises scene numbers associated with the thumbnails.

12. The apparatus of claim 11, wherein the scenes view further comprises an indication of whether a scene associated with the thumbnails is triggered by a mouse click.

13. The apparatus of claim 12, wherein the scenes view further comprises a visual representation of linearity to a next scene.

14. The apparatus of claim 13, wherein the scenes view further comprises a transparent scene thumbnail that, upon selection, opens up a temporary new scene.

15. The apparatus of claim 14, further comprising computer-executable instructions that, when executed, cause the computer to:
receive a selection of the transparent scene thumbnail;
open up the temporary new scene;
receive a user input comprising a new animation effect in the temporary new scene;
create a new discrete state in the animation timeline, the new discrete state comprising the new animation effect; and
create a new scene from the temporary new scene, the new scene comprising the new animation effect and the new scene being a visualization for the new discrete state in the scenes view of the animation pane.

16. The apparatus of claim 15, wherein the user input comprises a direct manipulation of an object in the temporary new scene, the direct manipulation comprising a creation of a motion path for the object.

17. An optical, magnetic, or semiconductor computer-readable storage medium having instructions stored thereon which, when executed by a processor of a computer, cause the computer to perform operations comprising:
analyze a plurality of animation effects in an animation timeline to determine one or more discrete states to be generated for the animation timeline by analyzing which of the plurality of animation effects in the animation timeline are triggered by a pre-configured trigger or a user-controlled trigger, wherein an animation effect that is triggered by the pre-configured trigger or the user-controlled trigger indicates a start of one of the one or more discrete states;
generate the one or more discrete states for the animation timeline, the one or more discrete states comprising one or more of the plurality of animation effects;
present a slide selection pane comprising one or more slides in a user interface; and
present an animation pane in the user interface, the animation pane comprising a scenes view comprising thumbnails corresponding to the one or more discrete states.

18. The optical, magnetic, or semiconductor computer-readable storage medium of claim 17, wherein the thumbnails further comprise one or more objects configured in a layout, and wherein one or more of the plurality of animation effects are associated with the one or more objects.

19. The optical, magnetic, or semiconductor computer-readable storage medium of claim 18, wherein the scenes view comprises scene numbers associated with the thumbnails.

20. The optical, magnetic, or semiconductor computer-readable storage medium of claim 19, wherein the scenes view further comprises an indication of whether a scene associated with the thumbnails is triggered by a mouse click.

* * * * *